US008812411B2

(12) United States Patent
Malka et al.

(10) Patent No.: US 8,812,411 B2
(45) Date of Patent: Aug. 19, 2014

(54) DOMAINS FOR KNOWLEDGE-BASED DATA QUALITY SOLUTION

(75) Inventors: Joseph Malka, Haifa (IL); Elad Ziklik, Modiin (IL); Efim Hudis, Bellevue, WA (US); Meir Raviv, Rehovot (IL); Gadi Peleg, Redmond, WA (US); David Faibish, Tel Aviv (IL)

(73) Assignee: Microsoft Corporation, Redmond, WA (US)

( * ) Notice: Subject to any disclaimer, the term of this patent is extended or adjusted under 35 U.S.C. 154(b) by 270 days.

(21) Appl. No.: 13/288,957

(22) Filed: Nov. 3, 2011

(65) Prior Publication Data

US 2013/0117203 A1    May 9, 2013

(51) Int. Cl.
*G06F 15/18* (2006.01)
(52) U.S. Cl.
USPC ............................................................ 706/12
(58) Field of Classification Search
USPC ........................................................ 706/12, 47
See application file for complete search history.

(56) References Cited

U.S. PATENT DOCUMENTS

| 7,734,557 | B2 | 6/2010 | Meehan |
| 7,774,751 | B2 | 8/2010 | Zhuk |
| 2003/0217144 | A1* | 11/2003 | Fu et al. ............... 709/224 |
| 2004/0107203 | A1* | 6/2004 | Burdick et al. ........ 707/101 |
| 2004/0249791 | A1 | 12/2004 | Waters |
| 2005/0182739 | A1* | 8/2005 | Dasu et al. ............ 706/47 |
| 2009/0234826 | A1* | 9/2009 | Bidlack .................. 707/5 |
| 2013/0031044 | A1* | 1/2013 | Miranda et al. ........ 706/47 |
| 2013/0117202 | A1 | 5/2013 | Malka et al. |
| 2013/0117219 | A1 | 5/2013 | Malka et al. |

OTHER PUBLICATIONS

Dasu T. et al., "Data Quality through Knowledge Engineering", SIGKDD '03, Aug. 24-27, 2003, Washington, DC, USA, pp. 705-710.*
Dani M. et al., "A Knowledge Acquisition Method for Improving Data Quality in Services Engagements", 2010 IEEE International Conference on Services Computing, 2010, pp. 346-353.*
Prasad K. et al., "Data Cleansing Techniques for Large Enterprise Datasets", 2011 Annual SRII Global Conference, Mar. 29-Apr. 2, 2011, pp. 135-144.*
U.S. Appl. No. 13/288,954, filed Nov. 3, 2011 entitled "Architecture for Knowledge-Based Data Quality Solution".
U.S. Appl. No. 13/288,943, filed Nov. 3, 2011 entitled "Knowledge-Based Data Quality Solution".
EP Search Report dated Feb. 21, 2013 cited in Appln No. 12191241.4.
Sanderson, et al.; SDI Communities: Data Quality and Knowledge Sharing, Jun. 29, 2011, 27 pgs.

(Continued)

*Primary Examiner* — Jeffrey A Gaffin
*Assistant Examiner* — Dave Misir
(74) *Attorney, Agent, or Firm* — Nicholas Chen; Kate Drakos; Micky Minhas

(57) ABSTRACT

The subject disclosure relates to a knowledge-driven data quality solution that is based on a rich knowledge base. The data quality solution can provide continuous improvement and can be based on continuous (or on-going) knowledge acquisition. The data quality solution can be built once and can be reused for multiple data quality improvements, which can be for the same data or for similar data. The disclosed aspects are easy to use and focus on productivity and user experience. Further, the disclosed aspects are open and extendible and can be applied to cloud-based reference data (e.g., a third party data source) and/or user generated knowledge. According to some aspects, the disclosed aspects can be integrated with data integration services.

18 Claims, 17 Drawing Sheets

(56) References Cited

OTHER PUBLICATIONS

Furber et al., Oct. 11-15, 2010. Using semantic web resources for data quality management. In Proceedings of the 17th international conference on Knowledge engineering and management by the masses (EKAW'10), Philipp Cimiano and H. Sofia Pinto (Eds.). Springer-Verlag, Berlin, Heidelberg, 14 pgs. (cited in Jan. 25, 2013 OA).
Oracle Warehouse Builder User's Guide 10g, Release 2 (10.2.0.2), Apr. 2009, 138 pgs. (Cited in Feb. 21, 2013 Search Report).
Oracle Warehouse Builder User's Guide 10gR2, Transforming Data into Quality Information, An Oracle White Paper, Jan. 2006, 16 pgs. (Cited in Feb. 21, 2013 Search Report).
U.S. Official Action dated Jan. 25, 2013 cited in U.S. Appl. No. 13/288,954, 30 pgs.
William W. Everett, et al.; DQS Experience with SRE; Seventh International Symposium on Software Reliability Engineering, Nov. 2, 1996, pp. 219, 220.
Yeona Jang, et al.; A Knowledge-based Approach to Assisting in Data Quality Judgement, Dec. 1992.
Knowledge Based Master Data Management; Mar. 2007.
Mike Sanderson, et al.; SDI Communities: Data Quality and Knowledge Sharing, Jun. 29, 2011.
Introduction to Data Quality, Jun. 29, 2011.
Christian Furber, et al.; Using Semantic Web Resources for Data Quality Management, Jun. 28, 2011.
Faruquie et al., "Data Cleansing as a Transient Service", 2010 IEEE 26th International Conference on Data Engineering (ICDE), Mar. 1-6, 2010, pp. 1025-1036.
Müller et al., "Problems, Methods, and Challenges in Comprehensive Data Cleansing", Humboldt Universitat, Berllin, 2005, pp. 1-23.
Simoudis et al., "Using Recon for Data Cleaning", KDD-85 Proceedings, 1995, pp. 282-287.
PCT Search Report dated Mar. 22, 2013 cited in Appln No. PCT/US2012/062895.
Hao, et al., "Research on Information Quality Driven Data Cleaning Framework"; 2008 International Seminar on Future Information Technology and Management Engineering; Nov. 20, 2008, 3 pgs. (cited in Mar. 22, 2013 PCT Search Report, MS).
Low et al., "A Knowledge-Based Approach for Duplicate Elimination in Data Cleaning"; Information Systems Journal, vol. 26, Iss. 8, Dec. 2001; 22 pgs. (cited in Mar. 22, 2013 PCT Search Report, MS).
Response dated Apr. 25, 2013 cited in U.S. Appl. No. 13/288,954, 22 pgs.
U.S. Appl. No. 13/288,954, Final Office Action mailed Jul. 1, 2013, 23 pages.
Faruquie et al., "Data Cleansing as a Transient Service", 2010 IEEE 26th International Conference on Data Engineering (ICDE), Mar. 1-6, 2010, pp. 1025-1036. (cited in Oct. 9, 2013 OA).
Müller et al., "Problems, Methods, and Challenges in Comprehensive Data Cleansing", Humboldt Universitat, Berllin, 2005, pp. 1-23. (cited in Oct. 9, 2013 OA).
Simoudis et al., "Using Recon for Data Cleaning", KDD-85 Proceedings, 1995, pp. 282-287. (cited in Oct. 9, 2013 OA).
U.S. Official Action dated Oct. 9, 2013 cited in U.S. Appl. No. 13/288,943, 32 pgs.
Response dated Feb. 10, 2014 cited in U.S. Appl. No. 13/288,943, 18 pgs.
U.S. Official Action dated Apr. 23, 2014 cited in U.S. Appl. No. 13/288,954, 21 pgs.

* cited by examiner

DOMAINS FOR KNOWLEDGE-BASED DATA QUALITY SOLUTION

TECHNICAL FIELD

The subject disclosure generally relates to data quality and more specifically to a knowledge-based data quality solution.

BACKGROUND

As computing technology advances and computing devices become more prevalent, the usage of computers for daily activities has become commonplace for both personal and business reasons. To keep up with demand, data collection has grown exponentially. The purpose of data collection, and later processing of the data, is to understand the meaning of the collected data and assemble the gathered data for a useful purpose.

A problem associated with the accumulation of data, and any corresponding usage of the data, is errors contained within the data (e.g., low quality data). Examples of errors can include incorrect data, missing data, typographical errors, misplaced data, duplicates, as well as other problems. People and business that rely on data that contains errors can base decisions, analysis, and/or other actions on the data and, if the data is flawed, the resulting decisions, analysis, and so on, can also be flawed. If the errors are discovered after the fact, confidence and related trust in the data can be compromised. In some cases, if the data does not meet a sufficient quality level, the data might not be relied upon.

Some systems utilize a generic approach to improving data quality. The generic approach is based on a "one-size fits all" mentality. For example, the generic approach applies generic algorithms to the data in an attempt to cleanse or improve the quality of the data. Since generic algorithms are applied regardless of the data contents, the generic approaches can only provide limited solutions. In some cases, the generic approach might not be able to solve the problems associated with the data. Thus, the data that has been cleansed with the generic algorithms can still be of low quality since the original problem might not have been addressed.

The above-described deficiencies of today's computing systems and data quality solutions are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

Aspects disclosed herein relate to providing a knowledge-based data quality solution. The data quality solution is based on a clear separation of acquiring knowledge about the data and processing of the data. Also provided is a transferable, movable, plugable, knowledge container (e.g., knowledge base). The data quality solution also provides guided knowledge acquisition and seamless extensibility to cloud-based knowledge.

A further aspect relates to obtaining knowledge about data (e.g., creation of a knowledge base) from internal information (e.g., from the client or from the data itself) and external information (e.g., from third party websites that contain data quality solution knowledge for downloading). Further to this aspect, the knowledge base is applied to clean the data, profile the data, or perform semantic de-duplication.

Another aspect relates to an architecture that includes a data quality server (and internal components) linking clients and third party websites that contain data quality solution knowledge for downloading. Further, an aspect relates to computer-aided knowledge acquisition and interactive cleansing. Yet another aspect relates to the creation of domains, composite domains, and cross-domains. Such domains are moveable, downloadable, and can be shared.

These and other embodiments are described in more detail below.

BRIEF DESCRIPTION OF THE DRAWINGS

Various non-limiting embodiments are further described with reference to the accompanying drawings in which.

DETAILED DESCRIPTION

Overview

Figure 1:
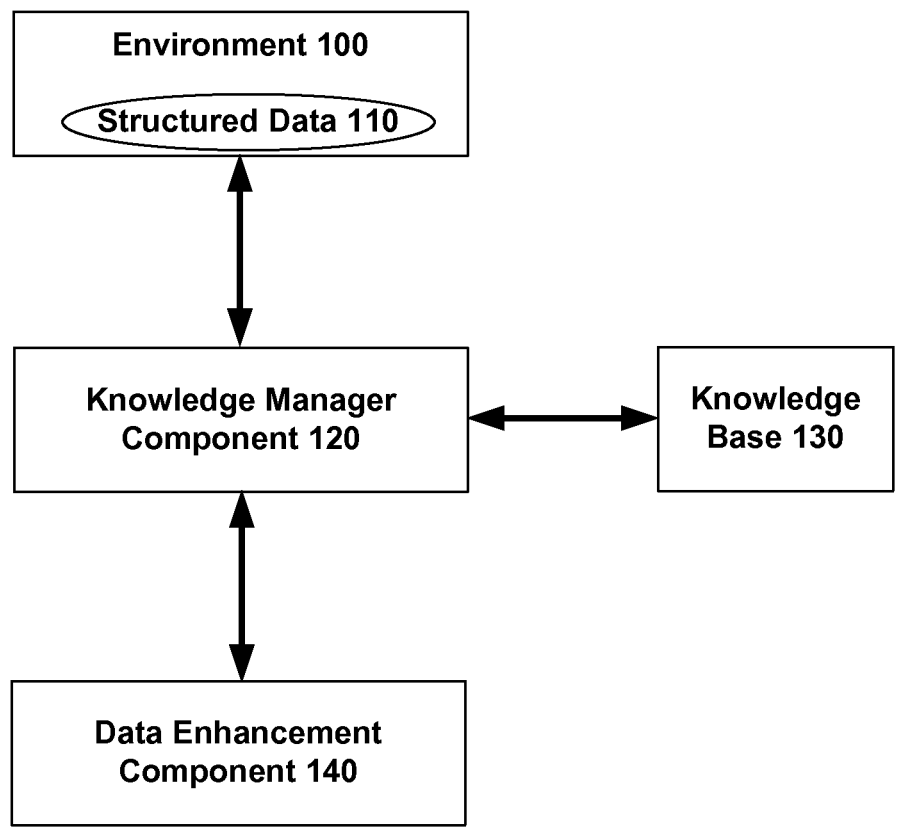
FIG. 1 illustrates a block diagram of an exemplary computing system, according to an aspect.

Data quality deficiencies can have a negative impact (sometimes a significant negative impact) on strategic business initiates. The impact of the data quality deficiencies (e.g., low quality data) includes extra time spent correcting the data (if errors are discovered), loss of credibility, customer dissatisfaction, compliance issues, and revenue loss, as well as other impacts. Thus, organizations of all sizes seek to improve the quality of their business data. Generic (e.g., zero knowledge based) approaches to data quality are insufficient to produce the high quality data used for today's businesses. Further, knowledge-based approaches to data quality can present a number of challenges such as knowledge acquisition, usage, mobility, extensibility, and so on.

Thus, it would be beneficial to provide a knowledge-based approach to data quality through the separation of acquiring knowledge and processing the knowledge to increase data quality. In an example, acquiring the knowledge can include computer-aided knowledge acquisition. One or more of the disclosed aspects provide a knowledge-driven data quality solution that is based on a rich knowledge base. For example, a data quality knowledge base is created, maintained, and reused for performing various data quality operations, such as data cleansing and matching. The data quality solution disclosed herein is rapid, easy to deploy, and can be established quickly.

The various aspects presented herein relate to data domains (e.g., types) for acquiring and representing effective knowledge for data quality processes, including simple domains and composite domains. Further aspects relate to semantic de-duplication. Other aspects relate to a spanning application approach to extensibility. Still further aspects relate to a business model of third party integration.

An aspect relates to a system comprising a knowledge manager component and a data enhancement component. The knowledge manager component is configured to gather information related to a set of data. The information is gathered at least in part from a sample of the set of data and the information is retained in a knowledge base. The data enhancement component is configured to perform one or more operations on the set of data to increase a quality of the set of data. The one or more operations are based on the gathered information.

In an example, the knowledge manager component gathers the information based on a description of the set of data, one or more rules, an inference, a list of correct values for a data field, and interaction with a user.

According to an example, the data enhancement component is configured to cleanse the set of data as a result of the gathered information. In another example, the data enhancement component is configured to de-duplicate the set of data based on the gathered information.

The system, in an implementation, further comprises a data analysis module configured to define the quality of the set of data based on at least one of completeness, conformity, consistency, accuracy, timeliness, and duplication.

The system, according to another implementation, further comprises an acquisition module configured to obtain semantic information about the set of data. Further, the system includes a discovery module configured to output one or more requests for details related to the semantic information and receive a response in reply to the one or more requests. The received response is retained in the knowledge base.

In another example, the system comprises a historical module configured to retain historical information related to attributes of user data and third party data. The data enhancement component is configured to utilize the historical information to perform the one or more operations on the set of data.

In a further example, the system includes a statistics module configured to provide statistical information related to at least one of quality of data, problems associated with the data, and a source of data quality problems. The data enhancement component is configured to utilize the statistical information to perform the one or more operations on the set of data.

In yet another example, the system includes a cleansing module configured to amend, remove, or enrich data that is incorrect or incomplete based on the information gathered by the knowledge manager component.

The set of data comprises a first subset of data and a second subset of data, the system, according to a further example, further comprises a matching module configured to identify duplicates between the first subset of data and the second subset of data. The system also includes a merge module configured to selectively remove the identified duplicates.

In another implementation, the knowledge manager component is further configured to create and upload the knowledge base to an external source. Further to this implementation, the knowledge base was previously created and uploaded to the external source. According to an example, the external source is a knowledge base store managed by a third party data source.

Another aspect relates to a method for data quality solutions. The method includes building a matching policy from information associated with a set of data. The information is contained in a knowledge base. The method includes performing matching training on the set of data based on the matching policy. The method also includes constructing a matching project as a result of the matching training. The matching project identifies duplicates included in the set of data and merges the duplicates to create a single entry.

In an example, building the matching policy includes downloading the knowledge base from a third party data source and supplementing the knowledge base with additional knowledge related to the set of data. The additional knowledge is obtained through assisted knowledge acquisition.

In another example, performing matching training comprises soliciting feedback information for the duplicates and supplementing the knowledge base with the feedback information. In a further example, constructing the matching project comprises constructing a spreadsheet that includes each of the duplicates and the information contained in each of the duplicates.

In an example, merging the duplicates is based on at least one of user preferences and rules. In another example, performing matching training comprises obtaining semantic understanding of at least a subset of the set of data.

Another aspect relates to a computer-readable storage medium comprising computer-executable instructions stored therein that, in response to execution, cause a computing system to perform operations. The operations include gathering information related to a set of data and supplying the information to a knowledge base. The operations also include performing one or more operations on the set of data based on the information in the knowledge base, wherein the one or more operations comprise cleansing the set of data.

In an example, the operations further comprise identifying duplicates contained in the set of data based on semantic understanding of the set of data, wherein the semantic understanding is included in the knowledge base. The operations also comprise selecting at least one of the duplicates based on conformance to a user preference or a rule and removing non-selected duplicates from the set of data.

Another aspect relates to an apparatus comprising a data quality engine. The data quality engine includes a knowledge discovery component configured to obtain information about data based on a sample of the data and save the information in a knowledge base. The data quality engine also includes a cleansing component configured to clean the data based on the information in the knowledge base and a matching component configured to remove duplicates found within the data.

In an example, the data quality engine communicates with a data quality server configured to interface with one or more data quality clients and one or more third party data sources. In a further example, the data quality server comprises an application program interface configured to perform reference data services on the information contained in the knowledge base.

According to another example, the data quality server communicates with an application program interface configured to obtain and update reference data from the knowledge base. Further, the application program interface is configured to obtain reference data services and reference data sets from third party sources.

In some examples, the knowledge discovery component is configured to provide assisted knowledge acquisition to acquire the information related to the data.

The apparatus, in an example, further includes a data profiling and exploration component. In another example, the apparatus includes reference data from a knowledge base store that includes published knowledge bases.

In another example, the reference data component is further configured to publish a locally created knowledge base to a remote storage media. According to another example, the reference data component is further configured to receive a selection for a locally created knowledge base and download the locally created knowledge base from a remote location.

Still another aspect relates to a method for interactive cleaning of data. The method includes receiving a request to improve a quality of a data source and accessing a knowledge base that includes information related to data elements in the data source. The method also includes applying a reference data service from an external source. The reference data service includes external knowledge about the data elements. The method also includes correcting a subset of the data elements as a function of the reference data service.

In an example, accessing the knowledge base comprises obtaining reference data definitions for the data elements. According to another example, accessing the knowledge base comprises obtaining values and rules to apply to the data elements. In a further example, accessing the knowledge base comprises obtaining a matching policy configured to identify and eliminate duplicates among the data elements.

According to another example, correcting the subset of data elements comprises reviewing the data elements for incorrect records and outputting a suggestion to correct at least one of the incorrect records. Further to this example, the method includes applying a correction to the at least one of the incorrect records based on an affirmative reply to the suggestion.

In an example, applying the reference data service comprises using the reference data service from a third party data service. In another example, applying the reference data service comprises receiving a selection for the reference data service and using the reference data service from the external source.

A further aspect relates to a system comprising means for soliciting information about a set of data. The system also includes means for storing the information in a knowledge base. Also included in the system is means for evaluating the information based on the knowledge base. Further, the system includes means for cleansing the data as a function of the evaluation and means for removing duplicates within the set of data based on the evaluation.

The system, according to an example, also includes means for providing computer-assisted knowledge acquisition to acquire the additional information.

In some examples, means for removing the duplicates is further configured to create a consolidated view of the data, wherein the consolidated view is output in a visual format.

Yet another aspect relates to a system for data quality solutions. The system includes an access module configured to acquire data information for a first set of data and a second set of data. System also includes a domain creation module configured to create one or more domains for the first set of data and the second set of data. The system also includes a compile module configured to aggregate the one or more domains and populate a knowledge base with the aggregated domains. The knowledge base is used for processing one or more data quality sets.

In an example, the domain creation module is configured to create the domain as a function of the data or attributes of the data. In another example, the domain creation module is further configured to create a basic domain that includes quality data issues associated with attributes of the first set of data or the second set of data. In yet another example, the domain creation module is further configured to create a composite domain based on rules that apply across two or more domains.

The access module, in another example, is configured to acquire data information through an aided knowledge acquisition process. According to some examples, the knowledge base comprises a plurality of domains packaged as a single movable unit. In another example, the knowledge base is stored in a sharable and downloadable format.

The system, in an implementation, includes an acquisition module configured to obtain semantic information for the first set of data and the second set of data. The system also includes a matching module configured to identify duplicates between the first set of data and the second set of data based in part on the semantic information. Further, the system includes a merge module configured to merge the identified duplicates at about the same time as the first set of data and the second set of data are combined.

In some implementations, the system further includes a historical module configured to capture historical information related to attributes of the first set of data and the second set of data, wherein the historical information is included in a domain. In a further implementation, the system includes a statistics module configured to capture statistical information related to data quality metrics associated with a source of the first set of data and the second set of data, wherein the statistical information is included in a domain. In another example, the system includes an inference module configured to make one or more inferences related to the first set of data or the second set of data, wherein the one or more inferences are included in a domain.

According to another aspect is a method that includes obtaining reference data associated with an attribute and a reference data service provider. The method also includes creating a plurality of domains for each attribute, wherein each of the plurality of domains comprise an attribute and reference data associated with the attribute. Further, the method includes storing a compilation of the plurality of domains as a knowledge base.

In an example, obtaining the reference data includes obtaining reference data definitions for the attributes. In another example, obtaining the reference data includes associating rules with one or more of the attributes.

In some examples, creating the plurality of domains includes creating a basic domain that includes quality data issues associated with the attributes. In another example, creating the plurality of domains includes creating a composite domain that comprises two or more basic domains, wherein a rule is applied across the two or more basic domains. In another example, storing the compilation includes uploading the knowledge base to a store maintained by an external source.

The method, according to some implementations, includes retrieving the knowledge base and performing one or more processes on the data as a function of the domains contained in the knowledge base.

Still another aspect relates to a computer-readable storage medium comprising computer-executable instructions stored therein that, in response to execution, cause a computing system to perform operations. The operations include acquiring reference data for a plurality of attributes and creating one or more domains that comprise the reference data and the plurality of attributes. The operations also include compiling the one or more domains as a reusable knowledge base, wherein the one or more domains comprise basic domains and composite domains. In an example, the operations further comprise implementing computer-aided knowledge discovery to acquire the reference data.

Herein, an overview of some of the embodiments for achieving a knowledge-based data quality solution has been presented above. As a roadmap for what follows next, various exemplary, non-limiting embodiments and features for knowledge-based data quality management are described in more detail. Then, some non-limiting implementations and examples are given for additional illustration, followed by representative network and computing environments in which such embodiments and/or features can be implemented.

Domains for Knowledge-Based Data Quality Solution

The aspects disclosed herein provide knowledge management, application of the knowledge, and administration services for data quality solutions. Knowledge management includes creating a knowledge base that contains information (e.g., reference data) about a set of data. The knowledge base can include information such as how to clean the data, how to learn from the data, how to connect an external source (e.g., an external source that provides the knowledge management), and so forth. In some aspects, the knowledge management and associated reference data can include creating and managing data quality knowledge bases, discovering knowledge from internal (e.g., internal to an organization) data samples, and exploration and integration with third party reference data. Applying the knowledge includes cleansing the data, correcting the data, performing matching, performing de-duplication, and standardization of the data, as well as other applications. The administrative services can include tools to monitor and control the data quality processes.

In some aspects, provided is a security model that regulates user access to the data. For example, each user can have a different role and different credentials associated with the role. In an example of three users, a first user can be an administrator, a second user can create the knowledge, and a third user can cleanse the data and use the data. The security model can be configured to maintain integrity of the knowledge base, according to an aspect.

Through utilization of the disclosed aspects, data can be cleansed and can remain cleansed through an on-going process of applying the data quality solutions. Based on this, confidence in the enterprise data can be built, restored, and/or expanded. Further, data quality results can be obtained quickly, rather than waiting weeks or months for a manual data quality process to be completed.

By way of further description with respect to one or more non-limiting ways to provide a data quality solution implemented through the separate acquisition and application of knowledge, a block diagram of an exemplary computing system is illustrated generally by FIG. 1. The exemplary computing system is configured to gather knowledge concerning data of interest (e.g., one or more sets of data from internal and/or external sources) to create a knowledge base and use the knowledge base to refine the data. For example, an original set of data can be refined to produce a set of data that has an improved quality as compared to the original set of data. According to some aspects, the exemplary computing system enables separation of acquiring knowledge related to the set of data and processing that can be performed with (or on) the data as a function of the knowledge.

The computing system illustrated in FIG. 1 includes an environment 100 that includes one or more sets of structured data 110. For example, the structured data can be retained in a multitude of formats including, but not limited to, databases, tables, spreadsheets, and so forth. The collection of data from various sources into structured data has increased exponentially. However, the data can be of low quality at least a portion of the time. For example, there might be one or more problems with at least a subset of the data (e.g., incorrect data, misspelled words, missing portions of data, misplaced data, duplicates, and other problems). The impact of problems with the data (e.g., low quality data) can have a direct influence on the use of the data. For example, if a decision or an analysis is based on the low quality data, the decision or the analysis can be inherently flawed and the data might no longer be relied upon for analysis.

In an example, if the data is manually entered (e.g., by a human operator), the potential for errors might increase during periods of fatigue, illness, boredom, or other causes, including simple error. In another example, data might be derived from noisy sources. For example, even though the data appears to have been generated automatically, at some point a human might have programmed one or more automatic sensors and/or manually entered data, the program may have been carelessly written, and/or the data generated has a low quality due to another unknown reason.

In order to provide an improved quality solution to correct or compensate for low-quality data, a knowledge manager component 120 is configured to gather information related to the data (e.g., one or more sets of structured data 110) contained in the environment 100. Such knowledge can be gathered from a description of the data (or subsets of the data), based on one or more rules, an inference, a list of correct values for a data field, interaction with a user, as well as other sources.

The information or knowledge gathered by knowledge manager component 120 can encompass different types of information. For example, the information can be a list of the correct values that are available for an attribute (e.g., a column in a spreadsheet). For example, if a column is for "U.S.

States", then there can be 50 correct values (although there can be more correct values if abbreviations are used in combination with the state name spelled out completely). The compact list of values, which in some cases can be a long list of all the possible values for the data, is a form of information or knowledge about the data that can be obtained by knowledge manager component 120.

In another example, the information gathered by knowledge manager component 120 can relate to common errors for spelling of data attributes. Another example of information about the data are synonyms (e.g., Jack and John, William and Bill, no and false, and so forth). Other examples relate to rules. For example, a rule can be that a field cannot be longer than 20 characters in length. A further example of a rule is that a field is to end with 8 digits or the field begins with a capital letter. Other examples include a multitude of rules, descriptions, a model (or models) of the data, and so on.

In accordance with some aspects, knowledge manager component 120 obtains the information and creates a knowledge base 130 from the acquired information. A "knowledge base" is an atomic unit where various types of data are retained. A "type" of data can be, for example, customer data with attributes (e.g., 10 attributes or columns), for which a knowledge base is created. Included in the knowledge base are one or more domains. A "domain" is an atomic unit that contains information about a particular data. Continuing the above example, examples of domains include addresses, names, cities, ages, and so forth.

Two different types of domains include a basic domain and a composite domain. A basic domain is an attribute of the data (e.g., company name) and contains all the knowledge about the data. For example, the domain can contain a list of core values, a list of errors, a list of synonyms, validation rules, and so forth. In some aspects, the domain might contain a statement that indicates to a data quality engine that the data contained in the domain is to be cleansed by a third party, for example.

In some cases, more than one domain is utilized. For example, for an address, the address can contain an address line, city, state, and zip code. In this case, each domain can be corrected separately. However, improved results can be obtained if the different domains are corrected together as an entity. For example, knowing the zip code can help to correct the address line or the state. To create this entity of different domains, a composite domain is created. The composite domain includes several domains and a relationship between the domains is defined within the composite domain.

The knowledge base 130 can be retained locally by knowledge manager component 120. However, according to various aspects, the knowledge base 130 is retrieved from an external source through cloud computing. Cloud computing can provide various computing capabilities (e.g., software, data access, storage services, and so forth) without a user (e.g. end-user) being aware of the physical location and/or configuration of the system that delivers the services.

In some aspects, the information retained in the knowledge base 130 is information provided by a third party (e.g., a commercial database that supplies the information), sometimes referred to as external reference data or external reference source. In other aspects, the information retained in the knowledge base 130 is information compiled by a user of the data (e.g., an organization associated with the environment 100), referred to as internal reference data. For example, a user can create internal reference data and the data can be compiled into a knowledge base by knowledge manager component 120. Further, the knowledge base can be uploaded to the cloud for storage and retrieval purposes for later use and/or modification.

Based on the reference data that is gathered by knowledge manager component 120, a data enhancement component 140 is configured to apply the knowledge to perform operations on the data to increase the quality of the data. "Data quality", as utilized herein represents the degree to which the data is suitable for use in business (as well as non-business) processes. The quality of data can be defined, measured, and managed through various data quality metrics. Examples of quality metrics include completeness, conformity, consistency, accuracy, duplication, timeliness, and so forth. In some aspects, data quality can be achieved through people, technology, and processes.

The data enhancement component 140 can be configured to cleanse the data based on reference information included in the knowledge base 130. For example, a row of data can be analyzed and errors within that row can be corrected as a function of the reference information. In another example, the data enhancement component 140 can be configured to complete missing portions of the data. In another example, the data enhancement component 140 can be configured to correct common misspellings, recognize synonyms, and/or perform other functions.

According to another example, data enhancement component 140 can be configured to perform matching (sometimes referred to as de-duplication or entity resolution) of the data. Matching or de-duplication is the process of starting with a list of entities and resolving the list so that each entity is included only once. For example, a database comprises a list of customers and it might be assumed that each customer is listed only once. However, it may be the case that a single customer can appear in duplicate due to misspellings or alternative spellings (e.g., the list includes "Tom Mangas", "Thomas Mangas", "Tom B. Mangas", "Mr. Mangas", and so forth, which all refer to the same person). In another example, the same person can be listed with different addresses, different phone numbers, different email aliases, and so on. The duplication problem can be compounded if the alternative names are combined with different addresses, phone numbers, and so on. Thus, the number of customers that an organization has might be overinflated, which can cause other problems (e.g., unrealistic business growth). Data enhancement component 140 is configured to identify such duplicates and merge the duplicates to produce a single entity and/or select one of the entities as representative of the duplicates and delete the other (duplicate) entities.

The changes or improvements to the data as performed by data enhancement component 140 can be communicated to the knowledge manager component 120 and retained as a part of the knowledge base 130. In accordance with some aspects, modifications to the data (e.g., by a user) after the data enhancement component 140 performs various operations on the data can be monitored and applied by knowledge manager component 120 to the knowledge base 130. It is to be understood that knowledge manager component 120 can perform ongoing information discovery to allow the knowledge base 130 to be updated in a timely manner.

In an embodiment, the computing system illustrated by FIG. 1 can differ in operation from conventional computing systems in order to provide additional benefits over those achievable by computing systems that employ generic solutions. Such generic solutions can be limited since actual knowledge of the data is not known and, therefore, there is a limit to the amount of corrections or the depth of the corrections that can be applied to the data. For instance, the computing system(s) disclosed herein can provide a data quality solution based on having knowledge of the data, which includes knowledge of the data contents, sources of the data, as well as the intended usage of the data. In an example, the computing system(s) can create knowledge about the data and use that knowledge to cleanse or de-duplicate the data. Further, such knowledge is reusable. For example, information workers and information technology professionals (e.g., users) can collaborate and reuse the knowledge for various data quality improvements and enterprise data management processes (e.g., cleansing, matching, standardization, enrichment, and so on).

Thus, the disclosed aspects can provide benefits related to delivering improved data quality in a consistent, controlled, managed, integrated, and fast manner, which provides improved business results. The data quality solutions knowledge base approach disclosed herein enables an organization, through its users, to efficiently capture and refine data quality related knowledge in a data quality knowledge base.

Figure 2:
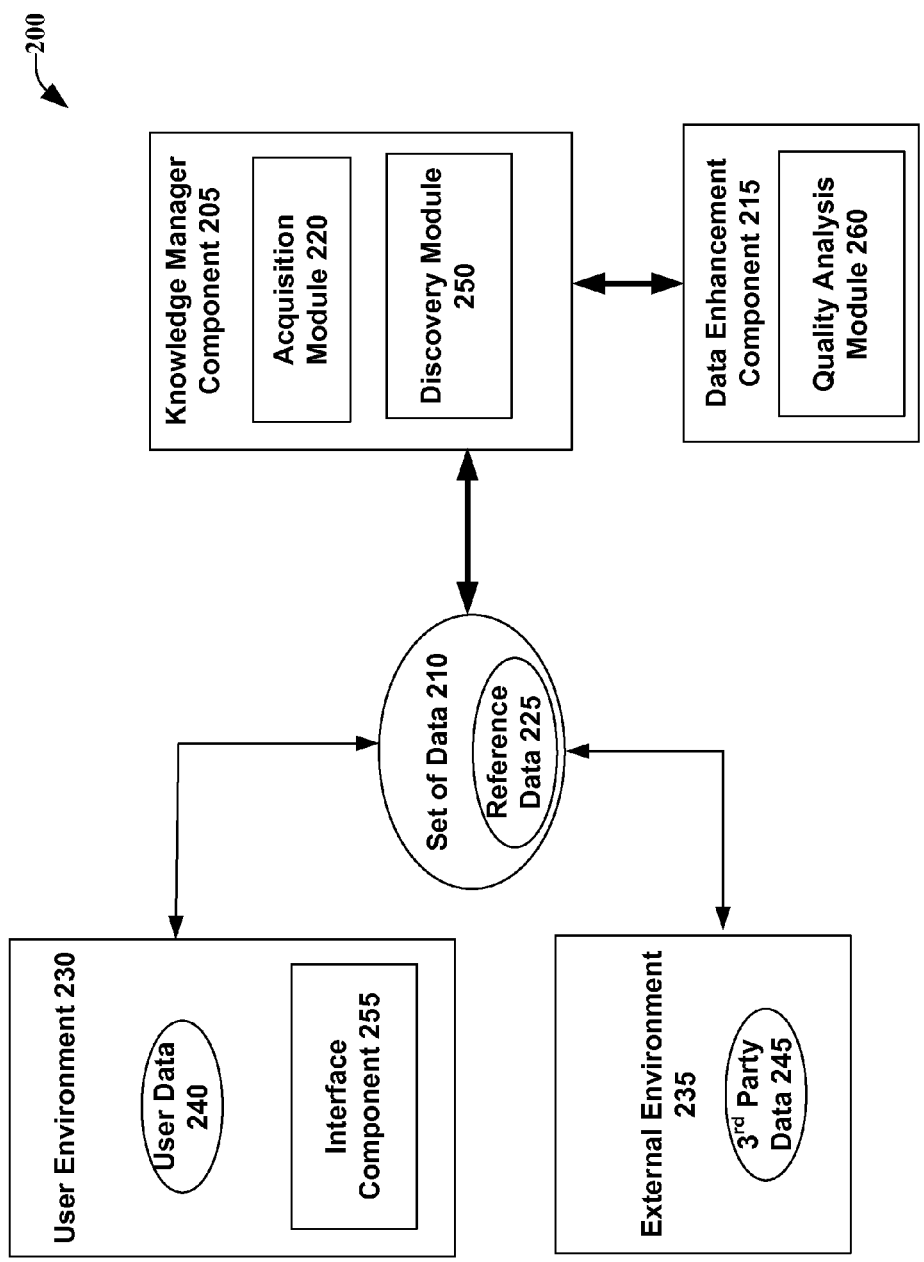
FIG. 2 illustrates a block diagram of a system configured to provide a knowledge driven data quality solution, according to an aspect.

FIG. 2 illustrates a block diagram of a system 200 configured to provide a knowledge driven data quality solution, according to an aspect. System 200 can be configured to obtain knowledge related to one or more sets of data and perform processing on the sets of data based on the obtained knowledge. According to an aspect, obtaining the knowledge and performing the processing are separate and distinct processes. According to various aspects, the amount and/or depth of information or knowledge that can be obtained about the data has a direct impact on the efficiency of application of the knowledge to the processing (e.g., cleansing the data, de-duplication of the data, or other functions) that can be performed on the data.

Included in system 200 is a knowledge manager component 205 that can be configured to obtain knowledge about the set of data 210 (e.g., data of interest). Also included in system 200 is a data enhancement component 215 that can be configured to improve a quality of the data based on information contained in a knowledge base. The knowledge base can be retained external to the system 200 or organization whose information is being processed. For example, the knowledge base can be published and stored in an external storage location (e.g., in the cloud). However, in some aspects, the knowledge base is retained locally (e.g., local to system 200).

In accordance with some aspects, data enhancement component 215 is configured to define whether the set of data 210 is adequate for the usage purpose or not adequate for the usage purpose. For example, the defining performed by data enhancement component 215 can be based on one or more quality metrics, which will be discussed in further detail below. If the set of data 210 is not adequate for the usage purpose, data enhancement component 215 is configured to perform processing on the data based in part on the information obtained by knowledge manager component 205 and/or based on the quality metrics.

Knowledge manager component 205 is configured to gather information related to the set of data 210. Such information gathering can be performed by knowledge manager component 205 based on explicit evidence and/or implicit evidence. The explicit evidence can include information received directly from a source (e.g., user, third party, etc.). The implicit evidence can include information obtained based on the data itself (e.g., determining a column in a spreadsheet contains state names, and so on).

To obtain the explicit evidence and/or implicit evidence, knowledge manager component 205 can include an acquisition module 220 that is configured to obtain information or reference data 225 about the set of data 210.

In an example, the reference data 225 can be obtained from a user environment 230 and/or an external environment 235 (e.g., external to the user). The user environment 230 can include user data 240, however, in some aspects, the user data 240 is stored in the external environment 235 (e.g., cloud computing). The user data 240 can be data generated by the user (e.g., directly entered by the user, data previously obtained by an external source and modified by the user or combined with other user data, and so forth). The external environment 235 includes third party data 245, which can include data from one or more external sources, such as a third party data service that supplies information, a database from which the data was imported, and so on. The user data 240 and/or third party data 245 can include the data itself as well as information (e.g., knowledge base) about the data.

The reference data 225 obtained by the acquisition module 220 can include information that provides a semantic understanding of the set of data 210. For example, semantic understanding includes knowledge related to synonyms or other components of the set of data 210. An example of semantic understanding is knowing that "Corp." and "Corporation" are intended to be interpreted as the same word. In order for acquisition module 220 to obtain this knowledge, a person or owner of the data can interact with the acquisition module 220 (and other components of knowledge manager component 205 and/or data enhancement component 215) to provide, at least some of the semantic understanding. In accordance with some aspects, acquisition module 220 can be configured to obtain the semantic understanding for the set of data 210 from the external environment 235 (e.g., external source, third party database, and so forth).

For example, acquisition module 220 can be configured to send a request for identification of content of various attributes or columns within a spreadsheet. The column identification can be that the column contains a proper name, the column contains an address, the column contains a sales amount, and so forth. Other information obtained by acquisition module 220 can include an identification of content of various attributes and related sources of the content (e.g., identification of where the data was obtained, methods used to obtain the data such as automatically generated data or manually entered data, and so forth).

According to an aspect, acquisition module 220 is configured to provide computer-aided knowledge acquisition. For example, acquisition module 220 can interact with a discovery module 250 that is configured to review at least a sample of the set of data 210 and attempt to understand the data based on various criteria (e.g., rules/policies, common misspellings, and so forth) contained in the reference data 225. The discovery module 250 (or another system 200 component) can ask the user to confirm (e.g., through a prompt that is displayed with the user computing environment) whether the understanding by discovery module 250 is correct or not. The discovery module 250 can perform a back-and-forth interaction with the user in order to obtain further information about the set of data 210, according to an aspect.

In accordance with some aspects, discovery module 250 (and other modules of knowledge manager component 205 and/or data enhancement component 215) can interact with the user through an interface component 255. The interface component 255 can provide a graphical user interface (GUI), a command line interface, a speech interface, Natural Language text interface, and the like. For example, a GUI can be rendered that provides a user with a region or means to load, import, select, read, and so forth, various requests and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed aspects are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

In an example, acquisition module 220 is configured to process a sample from the set of data 210 and make a determination as to what values are important. Based on the determination, discovery module 250 can solicit feedback from the user (e.g., through interface component 255) as to whether the determination is correct. Based on the feedback received from the user, the information as to which values are important can be retained (e.g., in a knowledge base). If the feedback from the user indicates that the determination by acquisition module 220 was incorrect, further input can be solicited from the user to improve system performance.

Based on the reference data 225 retained or developed by knowledge manager component 205, data enhancement component 215 is configured to perform processing on the set of data 210. The processing can include cleansing the data, matching data elements (e.g., de-duplication) as well as other processes to improve the data. If the data is of sufficient quality, data enhancement component 215 might determine that modifications to the data would not be beneficial.

In an aspect, data enhancement component includes a quality analysis module 260 that is configured to assess a data quality associated with the set of data 210. Data quality represents the degree to which the data is suitable for business usages (as well as other usages). Since data can be generated by multiple systems and parties across organizational and geographic boundaries, the data often contains inaccurate, incomplete, or stale data elements. Quality analysis module 260 is configured to utilize various data quality issues that revolve around data quality to address and correct these issues. In accordance with some aspects, quality analysis module 260 can ascertain that quality issues do not exist or are not of a sufficiently high amount and, therefore, cleansing (or other processing) of the data will not be performed.

In an example, quality analysis module 260 can utilize consistency as a data metric. Consistency is related to whether values represent the same meaning and/or whether the elements are consistently defined and understood. In an example, quality analysis module 260 can determine whether revenue is always presented in Dollars or whether it might also be presented in Euros.

Quality analysis module 260 can also perform an analysis of whether the data is complete and the relevant information is available. The completeness inquiry can ask the question of whether data values are missing or are in an unusable state. In some cases, missing data is irrelevant, but when the information that is missing is critical to a defined business process, completeness becomes an issue. An example of lack of completeness is a system that might have data where 20% of a last name field for a customer database is blank. In another example, a system might have data where 50% of zip codes are listed as "99999". In a further example, if there is an email field where only 50,000 values are present out of a total of 75,000 records, then the email filed is 66.6% complete.

Another quality metric or issue that can be analyzed by quality analysis module 260 relates to conformity. Conformity is concerned with whether there are expectations that data values conform to defined formats and, if so, whether all (or substantially all) the values conform to those formats. Maintaining conformance to defined formats is useful for data representation, presentation, aggregate reporting, searching, and establishing key relationships. For example, the gender code (e.g., male, female, unknown) in two different systems might be represented differently. In the first system, the codes are defined as "M", "F", and "U" and, in the second system, the codes appear as "0", "1", and "2". Quality analysis module 260 can be configured to correlate these two systems as a function of the knowledge related to the data (e.g., the columns in the first system and second system are both related to gender codes as determined by the knowledge manager component 205).

Another metric that can be analyzed by quality analysis module 260 is the accuracy of the data. For example, quality analysis module 260 can determine whether data objects accurately represent the "real-world" values that the data objects are expected to model. For example, incorrect spelling of product or person names, addresses, and even untimely or data that is not current (e.g., out of date) can impact operational and analytical applications. For example, a customer's address is a valid USPS address, however, the zip code is incorrect and the customer name contains a spelling mistake. In another example, the accuracy of the data can relate to whether the data accurately represents reality or a verifiable source. For example, a supplier might be listed as "active" but went out of business six years ago.

Quality analysis module 260 can also be configured to assess the validity of the data or whether data values fall within acceptable ranges. For example, salary values are to be between $60,000 and $120,000 for position levels 51 and 52. Quality analysis module 260 can review the data and ascertain whether the data conforms to the acceptable ranges.

Another metric that can be analyzed by quality analysis module 260 is the exclusiveness of the data. Such exclusive data quality issues arise when the data appears several times. For example, both Jack Ryan and John Ryan appear in the system, but they are the same person. Thus, quality analysis module 260 can determine if there are multiple, unnecessary representations of the same data object within the data set. The inability to maintain a single representation for each entity across the systems poses numerous vulnerability and risks. Duplicates are measured of a percentage of the overall number of records. There can be duplicate individuals, companies, addresses, product lines, invoices, and so on. The following example table depicts duplicate records existing in a data set.

| Name | Address | Postal Code | City | State |
|---|---|---|---|---|
| Mag. Smith | 545 S Valley View D. # 136 | 34563 | Anytown | New York |
| Margaret smith | 545 Valley View ave unit 136 | 34563-2341 | Anytown | New-York |
| Maggie Smith | 545 S Valley View Dr | | Anytown | NY. |

Quality analysis module 260 can evaluate one or more of the quality metrics and determine whether correction of the data is necessary. In some cases, if the quality metrics indicate that the data has a quality level above a threshold level (e.g., 98%, 95%, and so on), quality analysis module 260 might determine that correction of the data is not to be performed. However, if the quality level is below the threshold level, then quality analysis module 260 can recommend correction of the data (e.g., by data enhancement component 215). In accordance with some aspects, quality analysis module 260 provides the quality metrics used for the analysis and the values obtained to the knowledge manager component 205 for retention as a portion of a knowledge base and/or reference data 225.

Figure 3:
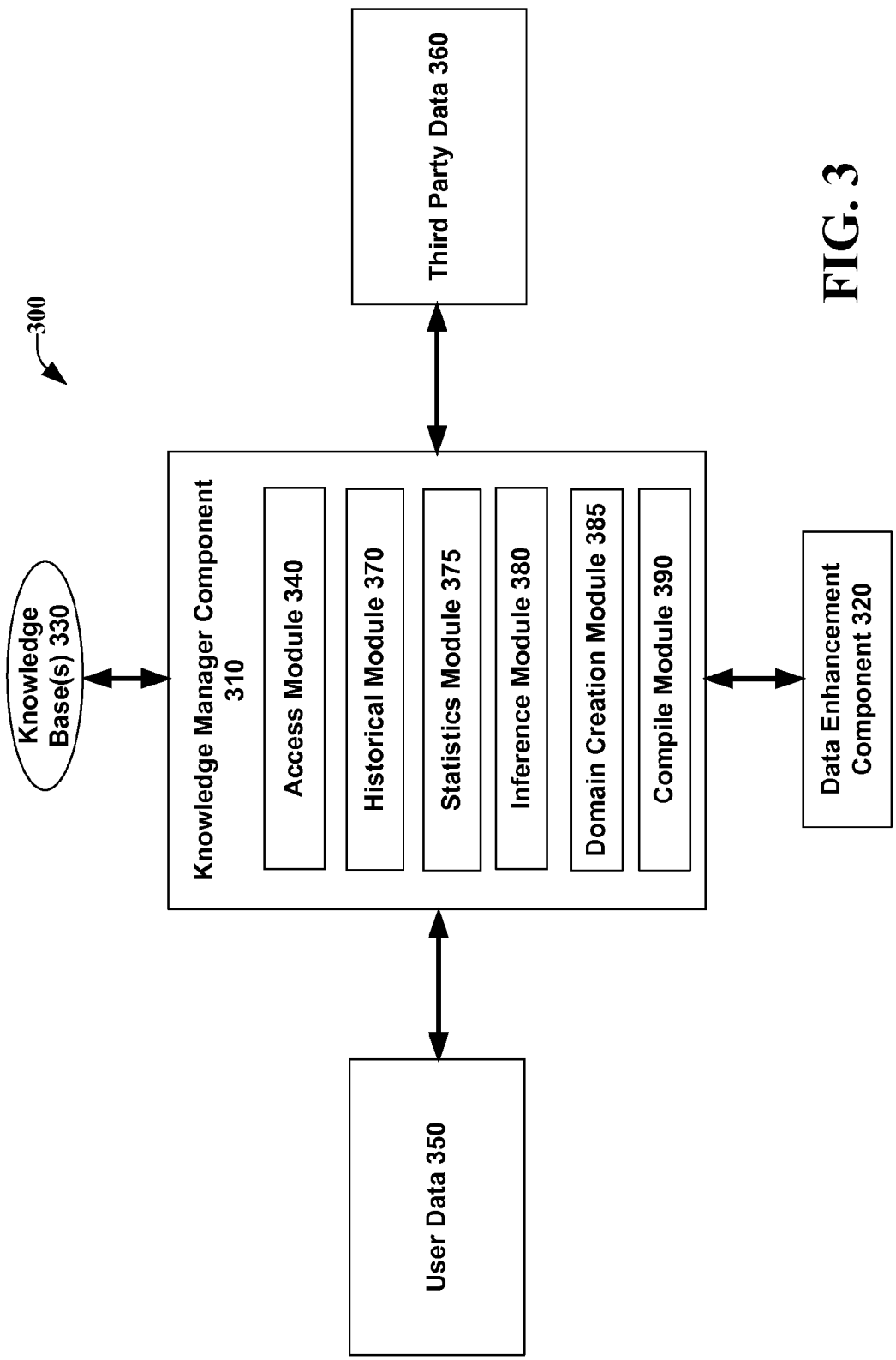
FIG. 3 illustrates another system for a data quality solution, according to an aspect.

FIG. 3 illustrates another system 300 for a data quality solution, according to an aspect. System 300 is configured to provide a knowledge-driven solution, focusing on the creation and maintenance of a data quality knowledge base that can be reused to perform various data quality operations, such as data cleansing and matching. The system 300 (and other aspects disclosed herein) provides a rapid, easy to deploy, easy to use data quality product that can be established with minimum effort. To that end, the disclosed aspects focus on creating an open environment for consuming third party knowledge.

A knowledge base is a portion of a knowledge-driven solution that is based on quality specific knowledge bases. In accordance with some aspects, the quality specific knowledge bases can reside in a Structured Query Language (SQL) server. SQL is a programming language (or declarative computer language) that can be utilize to update, delete, and/or request information from databases. Thus, SQL can be used to manage data in relational database management systems (RDBMS). The scope of SQL includes data insert, query, update and delete, and data access control, as well as others. Generally, the RDBMS includes data stored in tables and relationships between the tables are also stored in tables. Although various aspects are discussed with reference to SQL and RDBMS, it is to be understood that other programming languages and/or database management systems can be utilized with the disclosed aspects.

The knowledge bases are configured to store comprehensive quality related knowledge in the form of data domains. The data domains encapsulate the semantic representation of specific types of data sources. For example, the types of data sources can include name, city, state, zip-code, identification number, and so forth. For each data domain, the knowledge base stores all identified terms, spelling errors, rules, and external reference data that can be used to cleanse the enterprise business data or other data.

System 300 is configured to build the knowledge bases in a manner that enables rapid knowledge acquisition that is aligned with the data (e.g., enterprise business data). For example, system 300 can be configured to build the knowledge bases by acquiring knowledge through data samples and user feedback. The knowledge base is enriched through computer-assisted knowledge discovery processes or by user-generated knowledge and intellectual property by third party reference data providers.

System 300 includes a knowledge manager component 310 configured to obtain information about data and a data enhancement component 320 configured to perform one or more quality enhancement tasks on the data in view of the obtained information. The knowledge manager component 310 is configured to obtain information by processing a sample of the data and requesting user inputs related to the processed sample. In accordance with some aspects, the information obtained by knowledge manager component 310 is supplied to and included in the knowledge base 330.

In accordance with some aspects, the knowledge base 330 is configured to store all the knowledge related to a specific type of data source and can be maintained by a user (e.g., data steward) of an organization. For example, a first knowledge base can be configured to manage an organization's customer base and a second knowledge base can be configured to manage an employee database.

The one or more knowledge bases can contain data domains that relate to the data source (e.g., name, city, state, zip code, id number). For example, the knowledge base can store all identified terms, spelling errors, validation and business rules, and reference data that can be used to perform data quality actions on the data source. The knowledge base 330 can include a description of the data (e.g., the type of data included in each column), a list of correct values, a list of common misspellings, a rule, a policy, and/or other parameters.

Included in knowledge manager component 310 is an access module 340 configured to acquire data information to create the knowledge base 330. In accordance with some aspects, the knowledge base 330 can be constructed from user data 350 and/or third party data 360. In accordance with some aspects, the knowledge base 330 can be constructed based on interaction with a user (e.g., computer-aided knowledge acquisition) performed by knowledge manager component 310. The access module 340 can obtain the information at about the same time as a request for the data is received or at a different time.

Also included in knowledge manager component 310 is a historical module 370 that is configured to capture and retain historical information related to attributes of the user data 350 and/or third party data 360. For example, the historical information can include details as to problems discovered in the past, whether the problems were corrected or not corrected, and so forth. Historical information can also relate to data quality issues associated with a third party data source (e.g., similar data quality issues associated with the same third party data source). The data enhancement component 320 is configured to utilize the historical information at about the same time as the information from the knowledge base 330 to perform one or more operations on the data to increase a quality of the set of data.

A statistics module 375 can be configured to retain statistical information related to data quality metrics associated with a source of the third party data 360 (e.g., as provided by the data enhancement component 320). The data enhancement component 320 is configured to utilize the statistic information at about the same time as the information from the knowledge base 330 to perform one or more operations on the data to increase a quality of the set of data.

An inference module 380 is configured to make one or more inferences related to the data (e.g., user data 350 and/or third party data 360). For example, an inference can be that data from each source contains similar information (e.g., a gender code) and that "M" and "male" are the same and "F" and "female" are the same. In some aspects, the inference can be that when the majority of words in a column are city names, then the entire column is related to city names, even though some of the names are not recognized by knowledge manager component 310. In accordance with some aspects, the inference module 380 utilizes the historical data created by historical module 370 to perform the inference. Additionally or alternatively, the inference module 380 utilizes the statistical data created by statistics module 375 to perform the inference.

In an example, the inference module 380 can employ various artificial intelligence-based schemes for carrying out various aspects thereof. For example, a process for determining if a particular action improved quality of the data can be enabled through an automatic classifier system and process. A classifier is a function that maps an input attribute vector, x=(x1, x2, x3, x4, xn), to a confidence that the input belongs to a class, that is, f(x)=confidence(class). The classification can employ a probabilistic and/or statistical-based analysis (e.g., factoring into the analysis utilities and costs) to prognose or infer an action that would increase quality of the data and is to be automatically performed.

Also included in knowledge manager component 310 is a domain creation module 385 configured to create one or more domains for the data, wherein the domains are utilized to populate the knowledge base. For example a domain can be a basic domain, a composite domain, or a cross-domain. The creation of a particular type of domain by domain creation module 385 can be chosen as a function of the data and/or attributes of the data.

For example, domain creation module 385 can create a basic domain that contains an attribute of the data and the knowledge about the data. The domain can contain a list of core values, a list of errors, a list of synonyms, validation rules, and so forth. An example of an attributes is a column containing company names. In some aspects, the domain might contain a statement that indicates to a data quality engine that the data contained in the domain is to be cleansed by a third party, for example.

In another example, the domain creation module 385 might create a composite domain. Sometimes there are rules that are cross-domain (e.g. across columns). For example, a rule can be that if the first name is Jack, then the gender is male. Another example rule is that if the city is Des Moines, the State is Iowa. Although these are simple rules for purposes of explanation, more complex rules can be utilized with the disclosed aspects. The rules that describe features of data in several columns are referred to as composite domains.

The basic domains and composite domains are aggregated by a compile component 390 to create the knowledge base 330. For example, the knowledge base 330 with all the domains inside of it can be packaged as a single unit. This single unit is movable. For example, a domain that has been created can be placed in a retrievable location (e.g., on the Web). When placed in the retrievable location the domain can be browsed, downloaded into a current instance of the product and so forth. In accordance with some aspects, domains can be shared or can be purchased from a third party data source.

Figure 4:
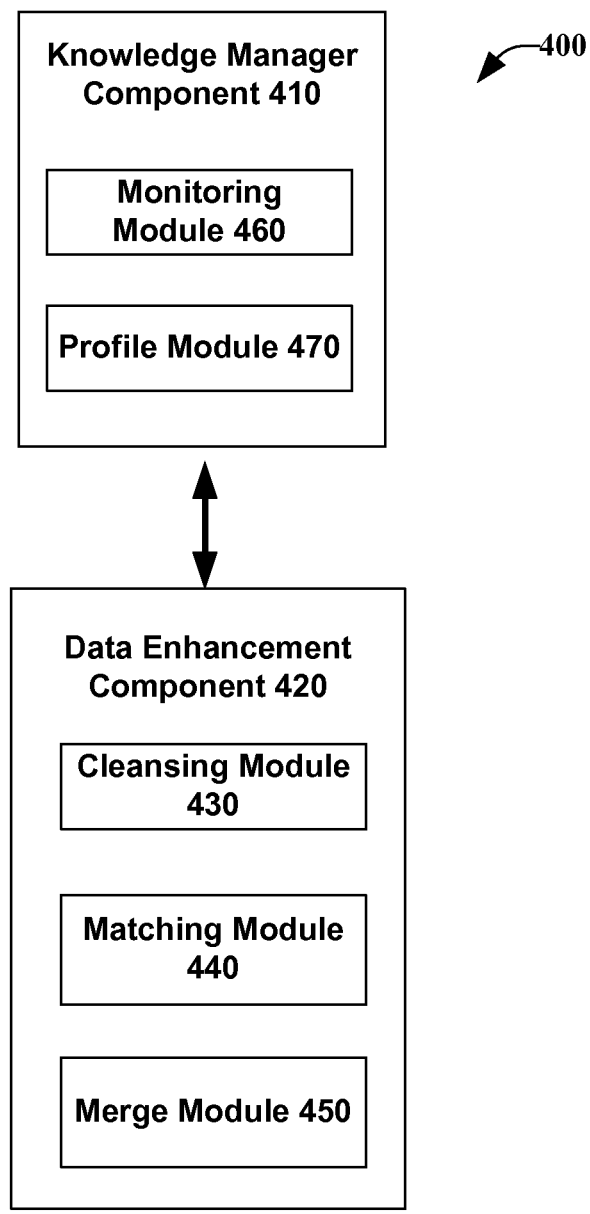
FIG. 4 illustrates a system configured to provide a data quality solution, according to an aspect.

FIG. 4 illustrates a system 400 configured to provide a data quality solution, according to an aspect. Included in system 400 are a knowledge manager component 410 and a data enhancement component 420 that are configured to provide a data quality solution based on a clear separation of acquiring knowledge about the data and processing of the acquired knowledge to improve a quality of the data.

Included in data enhancement component 420 is a cleansing module 430 that is configured to correct incorrect data. For example, cleansing module 430 can process the data and correct names, address, and so forth within the data. In some aspects, cleansing module 430 is configured to amend, remove, or enrich data that is incorrect or incomplete. In some aspects, cleansing module 430 is configured to perform correction, standardization, and/or enrichment of the data.

Also included in data enhancement component 420 is a matching module 440 configured to identify duplicates between a first set of data and a second set of data. Also included is a merge module 450 configured to selectively remove the identified duplicates. In accordance with some aspects, the merge module 450 can remove the identified duplicates before the second set of data is merged with the first set of data, at substantially the same time as the two sets of data are merged, or after the two sets of data are merged. In an aspect both the first set of data and the second set of data can belong to the same user.

In accordance with some aspects, matching module 440 is configured with capabilities to find the duplicates, which can be semantic duplicates (e.g., Shanetz Corporation, Shanetz Corp., and Shanetz Ltd.) as well as absolute duplicates (e.g., Shanetz Corp. and Shanetz Corp.). Another example of duplicates that can be identified by matching module 440 are misspelled representations of the same company. Although this is referred to as matching, it can also be referred to as de-duplication or entity resolution. In some aspects, matching module 440 is configured to identify, link, or merge related entries within or across sets of data.

Included in knowledge manager component 410 is a monitoring module 460 configured to track and monitor the state of quality activities and quality of data. For example, monitoring module 460 can perform an administrative function of watching a product for several people and track who is doing what, the processes that are running, and so forth. It is to be understood that any data gathering is conducted after authorization from the person or organization being tracked has been explicitly (or in some cases implicitly) received. For example, the customer (or organization through an authorized individual) can agree to share data and can be presented with one or more opportunities to opt-out of the collection of data. In some aspects, the person or organization has to take an affirmative action before the data is collected. According to other aspects, the person or organization can take an affirmative action to prevent the collection of data before that data is collected, which prevents such data collection.

Knowledge manager component 410 also includes a profile module 470 that is configured to analyze the data source and provide insight into the quality of the data. Such analysis and insight can help to identify data quality issues. For example, if there is a list of 1,000 customers, the data quality solution can be executed and whatever solution is provided is used. However, if there is a list of 1,000,000 customers, then a decision is to be made related to what data the data quality solution is to be applied to and/or whether to even execute the data quality solution to all or a subset of the data. Thus, profile module 470 can also make a determination of whether the data is good data and if executing the data quality solution on the data will improve the data. For example, if the data is already considered good data, the data quality solution might not be executed, which can save resources (e.g., time, expense, processing capabilities, and so forth). In accordance with some aspects, profile module 470 works in conjunction with quality analysis module 260 of FIG. 2.

Figure 5:
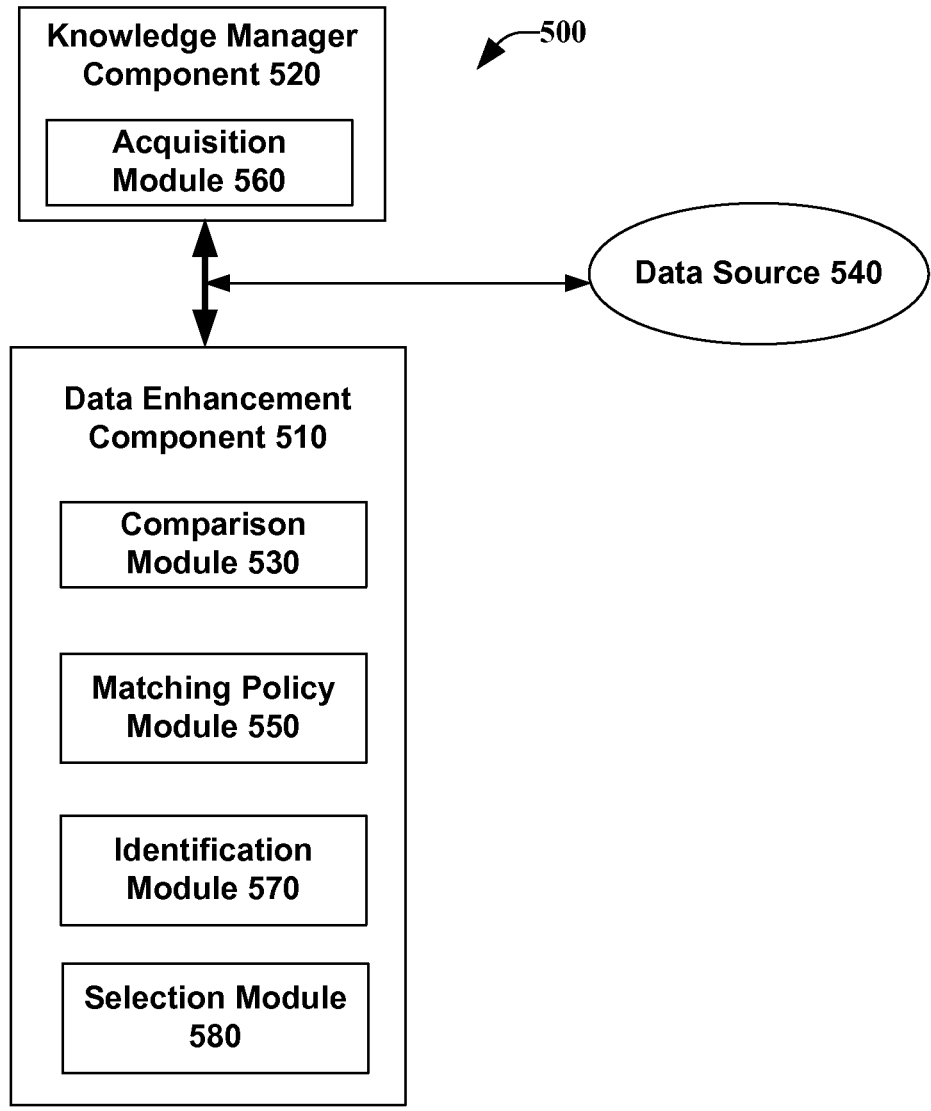
FIG. 5 illustrates a system configured to provide de-duplication of data, according to an aspect.

FIG. 5 illustrates a system 500 configured to provide de-duplication of data, according to an aspect. Included in system 500 is a data enhancement component 510 that is configured to perform various operations, including de-duplication of data, based on knowledge about the data that has been obtained by a knowledge manager component 520 (e.g., retained in a knowledge base).

Data enhancement component 510 includes a comparison module 530 that is configured to match data within a data source 540 and identify duplicates. For example, the data source 540 can include a first set of data and a second set of data. In an aspect, both the first set of data and the second set of data can belong to the same user. In another example, the duplicates between the first set of data and the second set of data can be identified to mitigate the creation of duplicates when the two sets of data are merged. In accordance with some aspects, the data source 540 (or more than one data source) can be a third party data market and data from the data market can be used to cleanse and enrich data with reference data services. Another example of the data source 540 are third party reference data providers with which the disclosed aspects can have an open integration relationship. A further example of a data source 540 is a website that contains data quality solution knowledge available for downloading. Yet another example of a data source 540 is creation of domains from the user's data sources (e.g., organization data). Still another example of a data source 540 is a set of data domains that come "out of the box" with the data quality solution.

Comparison module 530 is also configured to create a consolidated view of the data. For example, the consolidated view can include the duplicates, however, the duplicates are combined as a single entry for data output and analysis purposes. For example, in some aspects, only one of the duplicates is presented to the user and the other duplicates are arranged in a hierarchy under the one duplicate.

To facilitate the matching of data by comparison module 530, a matching policy module 550 is configured to build a matching policy. For example, matching policy module 550 can be configured to obtain one or more policies related to the data contained in the data source 540. In accordance with some aspects, at least one of the policies can be retained in a location that is external to the data source 540. For example, a policy can be related to a business objective (e.g., increase customer base by 7% by the end of the year). Based on this policy, it would be useful to have a concise list of customers at the beginning of the tracking period, wherein there are no duplicates for the customer listing.

As it relates to a customer database, a single customer might be listed numerous times, each time with one or more discrepancies. In an example, a customer can have four listings for the same company, as indicated below:

XY Sea Corporation, Shawn lakes, 7 XY Sea Way, Somewhere, NH 11111

XY Sea, Lakes, Seven XY Sea way, Somewhere, NH

XY Sea Corp., Shawn Henry Lakes, 7 XYC way, Somewhere, NH

XY See, S. H. Lakes, Somewhere, NH

As illustrated above, although there is only one customer (XY Sea Corporation), there are four listings. Such inaccuracies would create erroneous data related to the actual number of customers. Further, if these duplicates are not corrected when the threshold number is created (e.g., the number of customers at the beginning of the year), it can render the goal unattainable. For example, if the duplicates are found during the year and corrected, it can result in a net decrease of one, two, or three (e.g., removing one of the duplicates, removing all three of the duplicates, and so on) entries for each customer.

To identify the duplicates, an acquisition module 560 (e.g., acquisition module 220 of FIG. 2) included in knowledge manager component 520 can be configured to guide the user through various scenarios. For example, the user can be asked to review at least a subset of the data and identify duplicates, alternative spellings, common misspelling, synonyms, and so forth. Based, in part, on the information obtained by acquisition module 560, an identification module 570 is configured to create a matching project that can include a database or spreadsheet that identifies each duplicate. The database and/or spreadsheet can be presented to the user, according to an aspect. A selection module 580 is configured to select one of the duplicates as the "survivor" duplicate. For example, the other, non-surviving duplicates can be deleted, merged, and/or removed from view.

Figure 6:
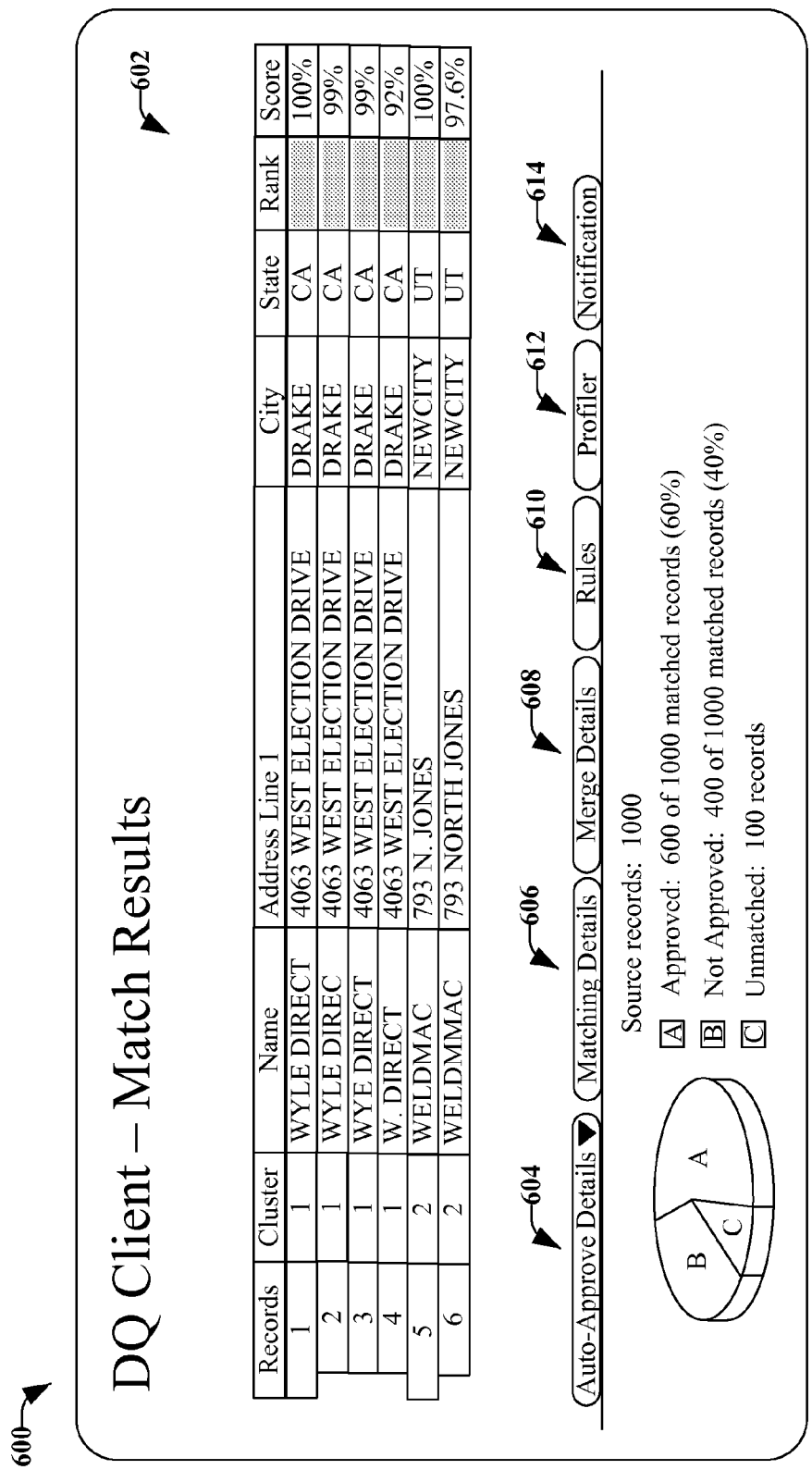
FIG. 6 illustrates an exemplary matching results domain constructed as an output of a matching project, according to an aspect.

For example, an output of the matching project can be constructed similar to the exemplary matching results domain 600 of FIG. 6. As shown in FIG. 6, information related to each row in a table that was identified as matching one or more other rows is displayed. For example, row 1 has matching rows 2-4 and row 5 has matching row 6. Also included is a score 602 as it relates to a confidence level that the data contained in that row is the correct data.

Other information can be provided in the matching results domain 600. Such information can include auto-approve details 604, which can be information related to corrections that were automatically applied. Other information, which can be presented in tabular format (or in a different format) includes, matching details 606 and merge details 608. Also provided can be rules 610 that were utilized as well as profiler data 612 and notification details 614.

In accordance with some aspects, a user can interact with the exemplary matching results domain 600 to update or correct data. For example, rules or policies of an organization might change. Thus, a user can access the rules 610 tab and update the rules contained therein. In another example, the user can review the merge details 608 and indicate some rows that are not to be merged. The information in the matching results domain 600 that is modified by the user can be utilized by data enhancement component 510 (of FIG. 5) to perform subsequent processes (e.g., correction, de-duplication, and so forth) on the data. In accordance with some aspects, the modifications by the user can be captured by knowledge manager component 520 and added to a knowledge base.

Figure 7:
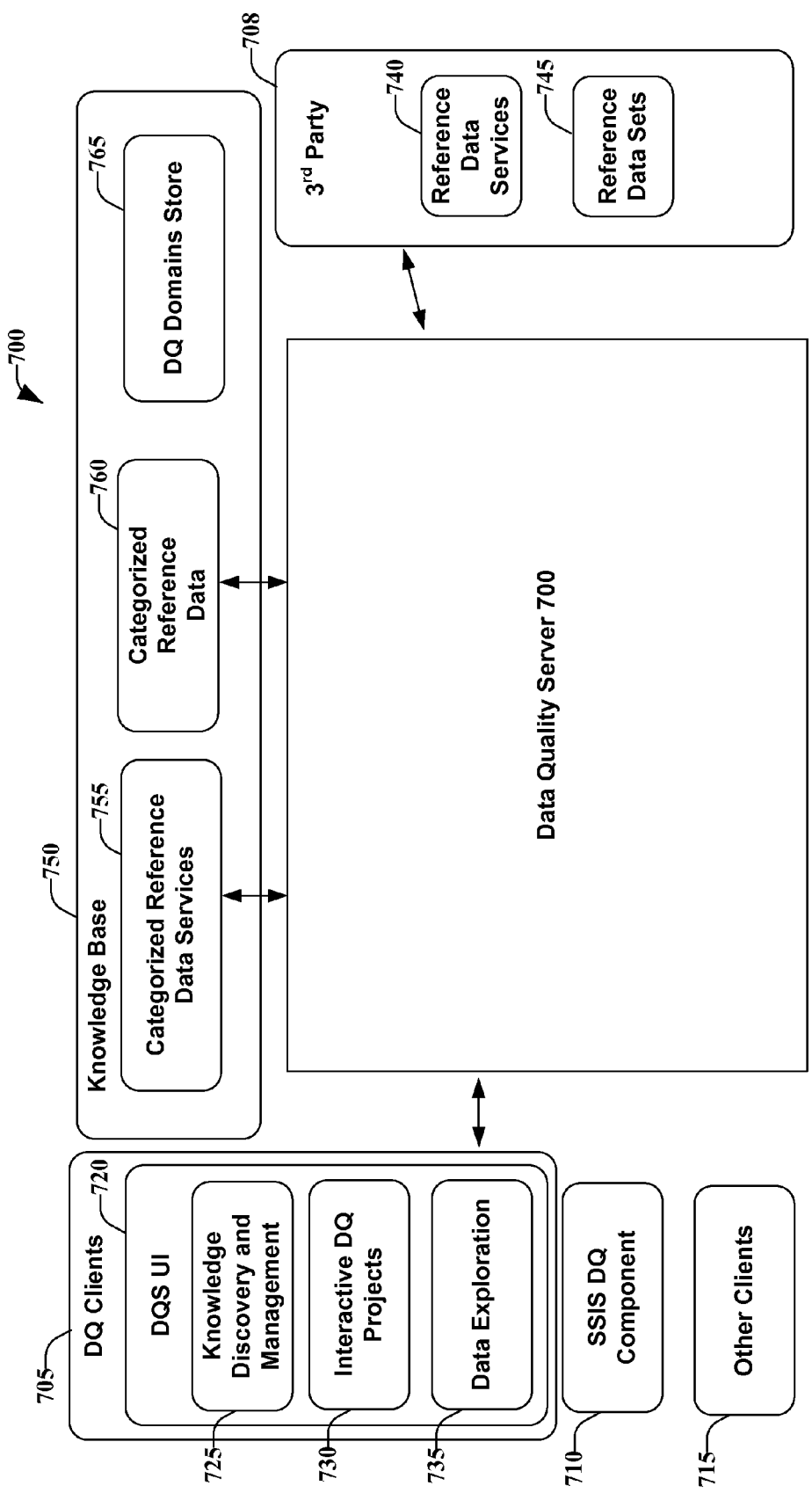
FIG. 7 illustrates an exemplary system architecture for knowledge-based data quality solutions, according to an aspect.

FIG. 7 illustrates an exemplary system architecture for knowledge-based data quality solutions, according to an aspect. As illustrated a data quality server 700 interfaces with one or more data quality (DQ) clients 705 and/or one or more third party data sources 708. The data quality clients 705 can include a data integration component 710 (illustrated as a SSIS Data Quality (DQ) component) as well as other clients 715. According to an example, the data integration component 710 can be provided and executed in a related application (e.g., a database program or application), in which the mapping and selection of a knowledge base can be provided. In an aspect, the knowledge base already exists and additional settings that are configurable and definable are provided (e.g., what to do with suggestions). According to some aspects, the data integration component 710 can be configured as a synchronous data flow transformation component that enables correcting the input data according to domain values, rules, and reference data associated with a designated data quality knowledge base.

In some aspects, the data quality clients 705 provide a self-service data quality experience through a dedicated data quality solution client, where a user with no database experience can create, maintain, and execute data quality operations. For example, there is minimal setup and preparation time through interaction with a user interface 720 that provides computer-assisted data acquisition and can facilitate interaction with a user. Through the computer-assisted data acquisition, knowledge discovery and management 725 can be obtained, interactive data quality projects 730 can be performed, and data exploration 735 can be implemented.

Knowledge discovery and management 725 relates to creating and maintaining a data quality knowledge base (DQKB). For example, knowledge management is a set of functionalities that enables a data steward (or other user) to manually define, update, and review the DQKB's knowledge. Knowledge discovery is an automated computer-assisted acquisition of knowledge form a data source sample. The knowledge discovery and management 725 also provide matching policy training where a set of rules that will serve as the policy governing the matching process can be defined. Also provided by knowledge discovery and management 725 is reference data exploration where a user can explore, choose, and integrate reference data from third parties into the DQKB domains.

The interactive data quality projects 730 enable correcting, standardizing, and matching source data according to domain values, rules, and reference data associated with a designed data quality knowledge base.

In accordance with some aspects, administration is also provide which can encompass several administrative functions. An example of an administrative function is monitoring current and past data quality processes, such as data correction and matching. Another administrative function relates to a definition of reference data providers. Other examples of administrative functions are settings of parameters related to data quality activities.

The one or more third party sources 708 can include reference data services 740 and/or reference data sets 745. In an example, the reference data services 740 and/or reference data sets 745 can be configured to accept data and can output whether the data is valid or not valid. In another example, data can be accepted and an output can be whether the data is valid and/or suggestions for improving a quality of the data. In some aspects, the reference data services 740 and/or reference data sets 745 are implemented as one or more APIs.

The one or more third party sources 708 can be, for example, reference data service providers. The reference data service providers can provide services, which can be similar to a service-oriented architecture (SOA) approach. For example, a SOA is a set of principles and/or methods for designing and developing software in the form of interoperable services, which can be business functionalities. SOAs can be used during development and integration phases. In addition, SOAs provide users of services the ability to become aware of the available SOAs.

The data quality server 700 can interact with a knowledge base 750, which can be an external reference data source. The external data sources can be, for example, commercial data sources that routinely gather or collect information related to a variety of topics. For example, the commercial data sources can collect information related to categorized reference data services 755, categorized reference data 760, and/or a data quality domains store 765. The user can select and download a knowledge base from the cloud (e.g., cloud computing), according to an aspect. Additionally or alternatively, a user can create a knowledge base and upload it to the cloud (e.g., cloud computing).

Figure 8:
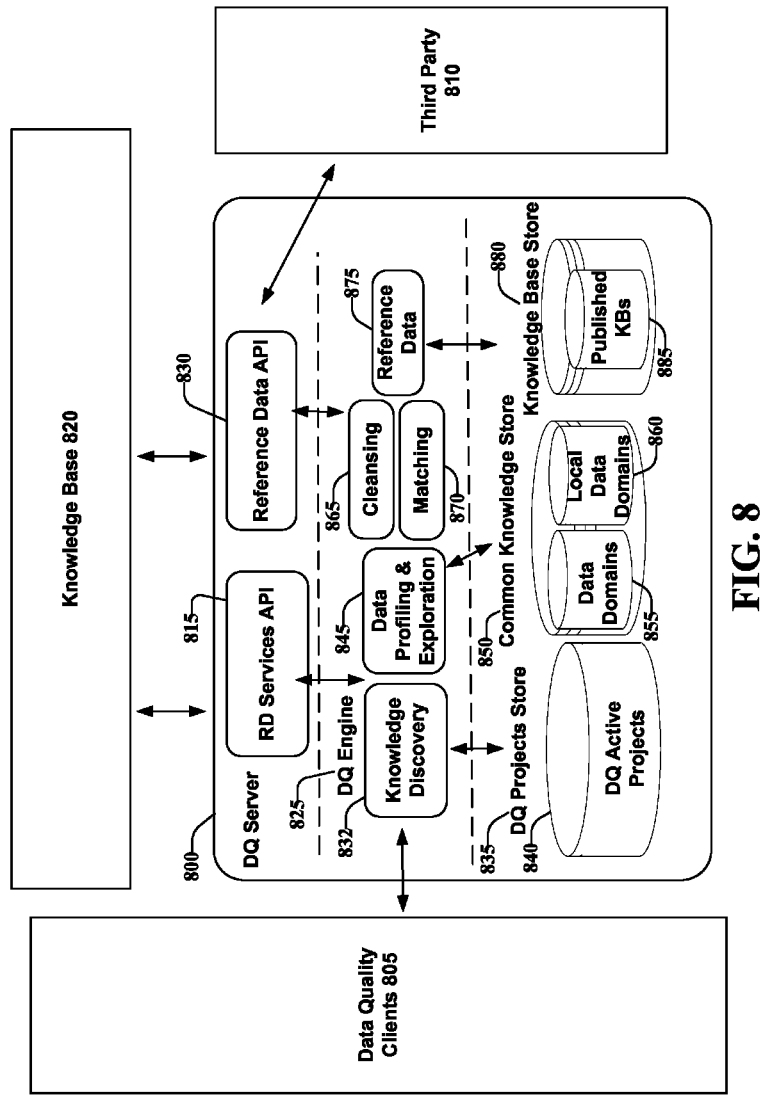
FIG. 8 illustrates components of a data quality (DQ) server, according to an aspect.

FIG. 8 illustrates components of a data quality (DQ) server 800, according to an aspect. Data quality server 800 can interact with data quality clients 805 and third parties 810.

Data quality server 800 can include various application program interfaces (APIs). For example, included in data quality server 800 can be a research and development (RD) services API 815 that is configured to browse, set, validate, and perform other functions corresponding to a knowledge base 820 and a data quality engine 825. In another example, included in data quality server 800 is a reference data API 830 that is configured to browse, obtain, update, and perform other functions associated with a knowledge base 820 and perform actions (e.g., cleansing, matching, and so forth) on data in connection with the information contained in the knowledge base 820.

The data quality engine 825 includes a knowledge discovery component 832 that is configured to access a data quality projects store 835 that can comprise data quality active projects 840.

A data profiling and exploration component 845, included in data quality engine 825, is configured to access a common knowledge store 850. Included in the common knowledge store 850 can be one or more commercial data domains 855 that are maintained by commercial sources. Also included in common knowledge store 850 are one or more local data domains 860.

Also included in data quality engine 825 is a cleansing component 865 configured to clean the data (e.g., correct errors) based on information retrieved from the knowledge base 820. A matching component 870 is also included in data quality engine 825. The matching component 870 is configured to de-duplicate the data or remove duplicates found within the data.

Data quality engine 825 also includes reference data 875, which can be supplied to a knowledge base store 880. In some aspects, the reference data can be downloaded from a third party source. For example, if there is a third party that has the knowledge (e.g., U.S. addresses), the knowledge can be retrieved rather than having to manually create the knowledge. In accordance with some aspects, the knowledge base store 880 can include published knowledge bases 885. The published knowledge bases 885 can be one or more knowledge bases that are created and saved, such as in the cloud or in another retrievable format. For example, a knowledge base can be created and uploaded to a store (e.g., knowledge base store 880) and/or a knowledge base can be downloaded from a store.

Figure 9:
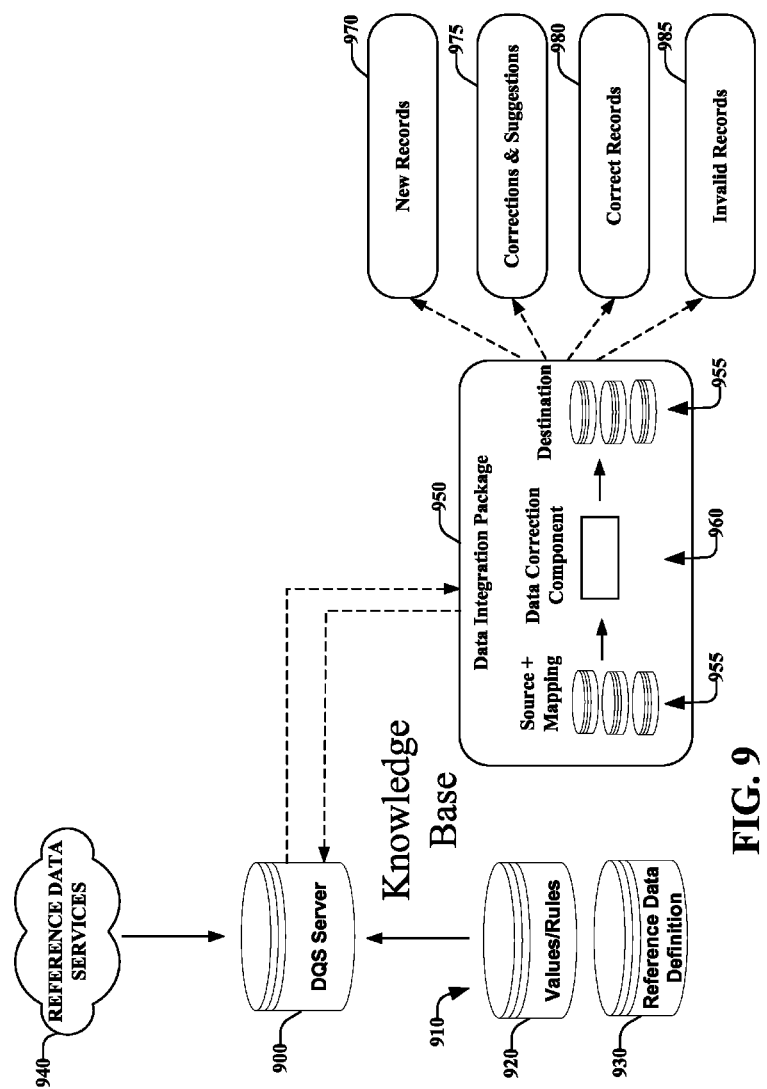
FIG. 9 illustrates batch cleansing using data integration, according to an aspect.

FIG. 9 illustrates batch cleansing using data integration, according to an aspect. As illustrated a data quality solution (DQS) server 900 includes, or has access to a knowledge base 910 that can include a multitude of information related to data. For example, the knowledge base 910 can include values and/or rules 920 and reference data definitions 930. For example, the values and/or rules 920 can relate to how the data is to be expressed. A rule can be that the word begins with a capital letter, for example. The reference data definitions 930 can include information about the data that would be useful to know about the data. For example, the definition can explain the data (e.g., the data in this column is the number of times a website was visited).

The data quality server 900 is also configured to obtain reference data services or cloud data services 940. For example, cloud computing can provide various computing capabilities (e.g., software, data access, storage services, and so forth) without a user (e.g. end-user) being aware of the physical location and/or configuration of the system that delivers the services. In an example, a knowledge base can be stored in the cloud as a reference data service.

The data quality server 900 can interface with a data integration package 950 (e.g., an SSIS package) that can perform various functions including a source and mapping function 955 that obtains additional information related to the data. A data correction component 960 is configured to correct one or more errors (e.g., spelling error, non-conformance to rules, and so forth) associated with the data. A destination function 965 is configured to provide the corrected data to an appropriate end user application (e.g., spreadsheet, database, table, and so forth). In an example, the corrected data is provided to the data quality server 900, which provides the corrected data to the user.

In some aspects, the data integration package 950 is configured to create new records 970 from the data provided by the cloud data services 940. For example, the new records 970 can be records that are in addition to the records already contained in a user database. In some aspects, the data integration package 950 is configured to provide corrections and suggestions 975. For example, one or more changes to the data (e.g., spelling corrections, insertion of missing data, movement of data from one location in a database to another location in the database, and so forth) can be presented to the user and, based on a reply received from the user, the one or more corrections can be automatically implemented. In some aspects, correct records 980 as well as invalid records 985 can be dynamically identified based on the knowledge base 910. For example, records that meet a policy and/or a rule can be identified as correct records 980 and those records that deviate from the policy and/or the rule can be identified as incorrect records 985.

Figure 10:
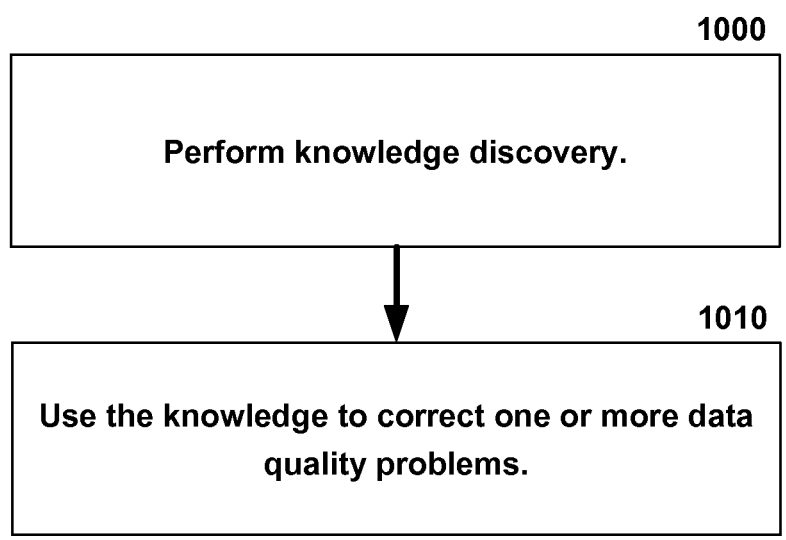
FIG. 10 illustrates a non-limiting flow diagram of a method for creation of a knowledge base and using the knowledge base to improve data quality, according to an aspect.

FIG. 10 illustrates a non-limiting flow diagram of a method for creation of a knowledge base and using the knowledge base to improve data quality, according to an aspect. At 1000, knowledge discovery is performed. The knowledge discovery can include processing a sample taken from a set of data and obtaining data about the sample from a user. For example, a request can be sent to the user for the user's input. The knowledge discovered can include a list of the correct values that are available for an attribute (e.g., a column in a spreadsheet), common spelling errors for attributes, synonyms, rules, descriptions, a model (or models) of the data, and so on. In accordance with some aspects, at about the same time as the knowledge is discovered (or at a different time), the knowledge information is retained in a knowledge base (e.g., in a computer-readable storage media).

At 1010, the discovered knowledge is used to correct one or more data quality problems. For example, if common spelling errors are found, the spelling errors can be dynamically corrected. In another example, if a column is identified as including state names and one of the fields includes the spelling "Idaoh", the field can be corrected to "Idaho" since the field is for a state (and "Idaoh" is not a common spelling error or is a common spelling error for a particular person). The knowledge discovery is on going such that additional knowledge can be acquired each time the data is used and/or corrected.

Figure 11:
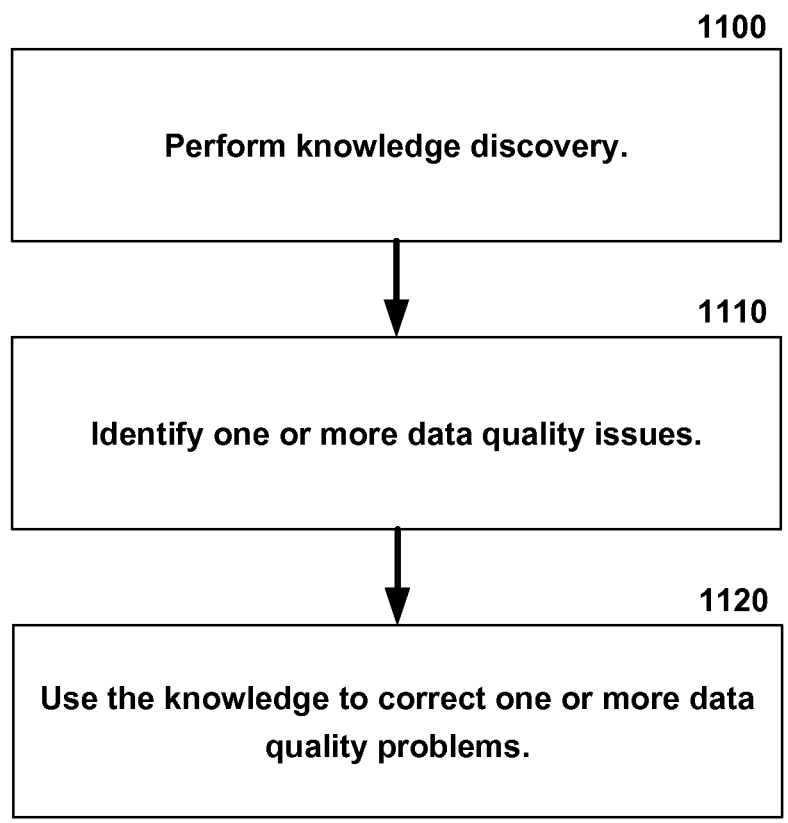
FIG. 11 illustrates a non-limiting flow diagram of a method for knowledge-based data quality solutions, according to an aspect.

FIG. 11 illustrates a non-limiting flow diagram of a method for knowledge-based data quality solutions, according to an aspect. At 1100, knowledge discovery is performed on a set of data (or a subset of the set of data, such as a sample of the data). For example, the knowledge discovery can be based on the data itself (e.g., interpretation of semantics) and/or based on information provided by the user (including information technology professions and data stewards). The information provided by the user can be a list of attributes of the data (e.g., "Phillis" is a correct spelling of a first name in some instances, however, "Phyllis" is also correct). The user can also provide information based on a request for further information (e.g., "The term "Phillis" has been entered, is this correct?") and the user can reply (e.g., "Yes", "No", and so on). In such a manner, the knowledge discovery can be expanded through an interactive computer assisted process. In accordance with some aspects, the knowledge discovered can be retained in a knowledge base.

At 1110, the set of data is reviewed in order to identify one or more quality problems. Various quality problems can be created when data is entered (e.g., manually or automatically) or imported from an external source (e.g., a third party data provider). In an example, if data is being manually entered into a database, some of the data might be entered incorrectly (e.g., transposed numbers, misspellings, missing data, duplicated data, and so forth) due to human error. In another example, when data is imported from a third party, that data might have various errors or quality problems. Such errors or quality problems include, but are not limited to, human error when data was manually entered, duplicates created with existing data (e.g., the data from the third party is a duplicate of the data already contained in the database), inconsistencies in the data (e.g., the user database uses the terms "Male", "Female", and "Unknown" while the third party data is identified with "M", "F", "U", or "1", "2", "3", and so forth).

The identified quality problems are corrected, at 1120, as a result of the knowledge discovery and the identified quality problems. For example, the knowledge about the data is used to correct problems, or to request further information related to whether the problem is to be corrected. It is to be understood that the knowledge discovery, at 1100, and/or the identification of the data quality problems, at 1110, can be recursive. For example, the data can be reviewed for either (or both) data quality and knowledge continuously, periodically, at variable intervals, or based on various parameters (e.g., at least a set of the data has changed, new data has been entered, a query has been executed on the data, and so forth).

In an example, if no (or few) data quality issues are identified, at 1110, the data might not be corrected. However, in other examples, the data is corrected regardless the number of data quality issues identified.

According to an aspect, the identified quality problems are utilized for statistical purposes (e.g., to access the quality of a data source). Further, the identified quality problems can be utilized to verify the effectiveness of the data quality solution. For example, after the problems are corrected, at 1120, the set of data can be reviewed again, at 1110, to determine whether problems still exist. If problems still exist, further knowledge might be collected, at 1100, to determine how the problems are to be corrected (e.g., by soliciting feedback from a user). As stated above, the collection of knowledge can be ongoing such that as the data is used, additional information about the data is collected and stored in a retrievable format.

Figure 12:
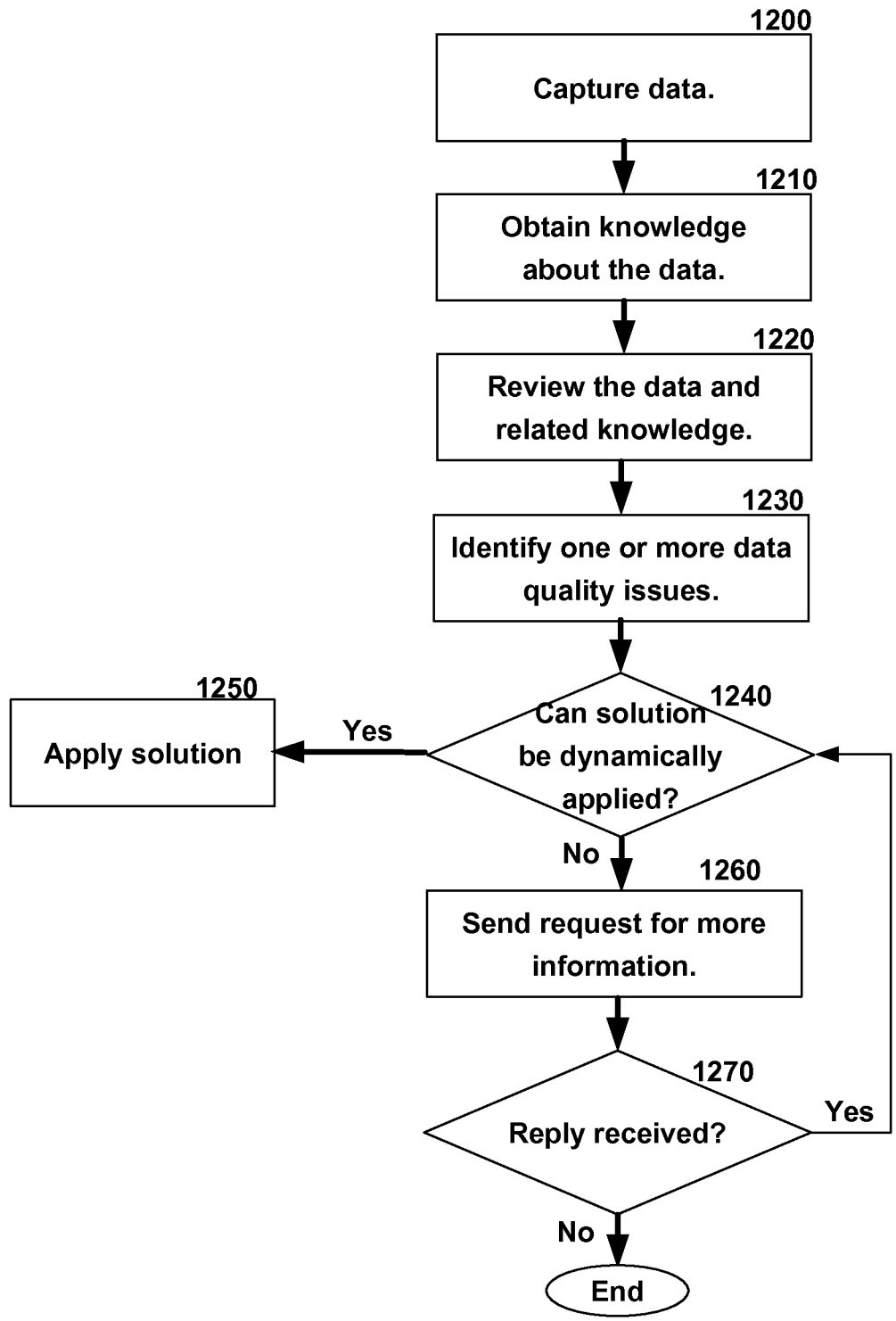
FIG. 12 illustrates a non-limiting flow diagram of another method, according to an aspect.

FIG. 12 illustrates a non-limiting flow diagram of another method, according to an aspect. At 1200, data is captured for inclusion in a table, database, spreadsheet, or another format. The data can be captured when a user manually enters the data, when the data is imported from an external source (e.g., a website, a third party data source, and so forth). In another example, the data can be obtained from another table, database, spreadsheet, and so forth, maintained by the user and/or a third party source. In some examples, the data can be from a table and the destination for the data is a spreadsheet (e.g., different formats). For example, a user might have a table that includes a listing of customers that are interested in a particular topic and would like to supplement the table with additional customers that have recently expressed interest in that topic. The additional customers can be obtained from a third party source that gathers marketing data and added to the table maintained by the user.

At 1210, knowledge about the data is obtained from the user by, for example computer-aided knowledge acquisition. The knowledge about the data can be utilized to increase data quality. Further, the knowledge can be retained as a knowledge base. According to an aspect, the knowledge base can be retained in a location that provides mobility, such as at a remote storage location (e.g., in the cloud). The obtained knowledge can be based on direct information (e.g., interaction with a user, user input) or based on an inference (e.g., a policy, a rule, a model).

The data and/or the knowledge about the data are reviewed at 1220 to determine if one or more data quality issues exist. In accordance with some aspects, the review can include evaluating one or more rules (e.g., knowledge) to determine whether the data conforms to the rules. In another aspect, the review can include comparing at least a subset of the data (e.g., an attribute or a column) against a listing of common misspellings, synonyms, and so forth.

As a result of the review, at 1230, one or more quality issues can be identified (if any are discovered). For example, a rule might be that the items in a column are to end with 8 digits. Items in the column that do not conform to the rule are flagged or otherwise marked. In another example, duplicates can be identified (e.g., based on a semantic understanding of the data) and one or more of the duplicates can be marked for deletion.

At 1240, a determination is made whether a solution to the quality issues can be dynamically applied. For example, if the rule is that the items in a column are to end with 8 digits, it might not be possible to correct the quality issue without further information or input from the user or from another source. In another example, if the quality issue relates to common misspellings, the spelling of the particular items can be automatically corrected.

If the solution can be applied dynamically "YES", at 1250, the solution is automatically applied. If the determination is that the solution cannot be dynamically applied ("NO"), at 1260, a request for additional information and/or confirmation is sent. For example, the solution might not be dynamically applied if more information is to be gathered, alternative solutions exist, and so on. The request can indicate the quality issue that was discovered and also provide a recommended solution to the problem. In an example, the request can be output as a prompt in a display on a user device asking the user to review the data and provide additional information that can be utilized to correct the problem. In accordance with some aspects, the additional information might indicate that the data is correct.

At 1270, a determination is made whether a reply is received. If a reply has been received ("YES"), at 1240, a determination is made whether the solution can be dynamically applied and/or whether additional information should be obtained. In such a manner, the user can continue to provide additional information under a more detailed understanding of the data is obtained, which can be included in the knowledge base.

If the determination, at 1270, is that a reply has not been received ("NO"), the processing can end. Alternatively, another request can be sent, at 1260, in an attempt to obtain the additional information and/or confirmation.

In accordance with some aspects, after a quality solution has been applied or if no quality solution will be applied, further data can be captured and knowledge about the existing, new, and/or modified data can be obtained. In such a manner, an on-going learning process is conducted so that additional knowledge and improved data quality can be achieved, according to an aspect.

Figure 13:
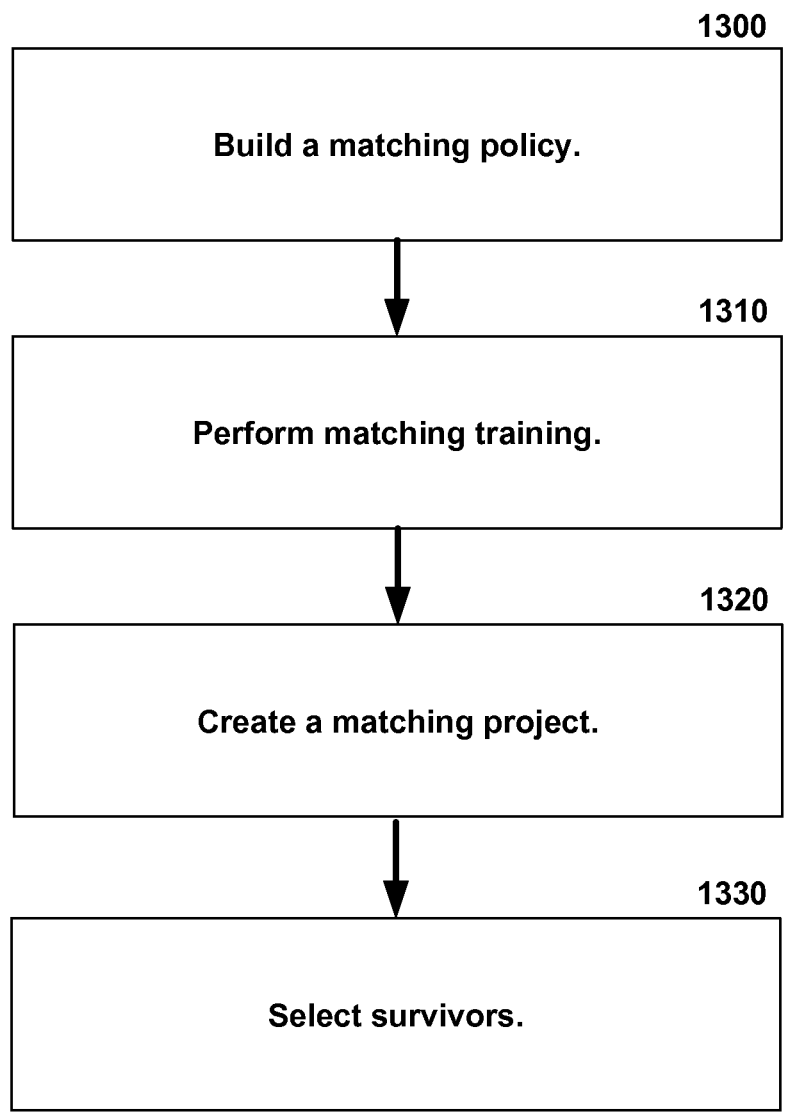
FIG. 13 illustrates a non-limiting flow diagram of a method for performing de-duplication as a knowledge-based solution, according to an aspect.

FIG. 13 illustrates a non-limiting flow diagram of a method for performing de-duplication as a knowledge-based solution, according to an aspect. De-duplication involves the identification of duplicates within the data or a data source and removing the one or more duplicates.

At 1300 a matching policy is built. The matching policy can be based on various types of knowledge related to the data. For example, the knowledge can include common misspellings, synonyms (e.g., William and Bill are the same, Corp. and Corporation are the same), and other data.

A matching training can be conducted, at 1310. The training, at 1310, can include soliciting feedback for potential duplicates. For example, two or more potential duplicates can be identified and a prompt can be sent to a user to confirm whether the potential duplicates are actual duplicates. If the potential duplicates are not duplicates, further information can be solicited from the user in order to identify why they are not duplicates. For example, reasons why the data was identified as duplicates can be provided to the user and information related to why the identification was incorrect can be provided. The additional information obtained can be added to a knowledge base.

In accordance with some aspects, the matching training can be conducted based on semantic understanding of the data. For example, the semantic understanding can be based on the knowledge that the terms "Corporation" and "Corp." are the same. In accordance with some aspects, the matching training is conducted based on exact duplication. In accordance with some aspects, the matching training can be based on exact duplicates and semantic understanding of the data.

Based on the information as to whether (or not) the potential duplicates are correct can be utilized to construct a matching project, at 1320. For example, the matching project can be constructed as a spreadsheet or database that includes each of the duplicates and related information as to why they are duplicates.

At 1330, one of the duplicates from each set of duplicates is identified as a "survivor". Such identification can be based on user preferences and/or a rule (e.g. select the duplicate that has the first letter of first and last names capitalized). For example, if one of the duplicates is "Scott Rosen" and the other duplicate is "Scott rosen", the first duplicate "Scott Rosen" will be chosen because that duplicate satisfies the rule and/or the user preference. If none of the duplicates satisfied the rule, other criteria can be used to chose the survivor (e.g. first one in the list, random selection of one of the duplicates, and so forth).

Figure 14:
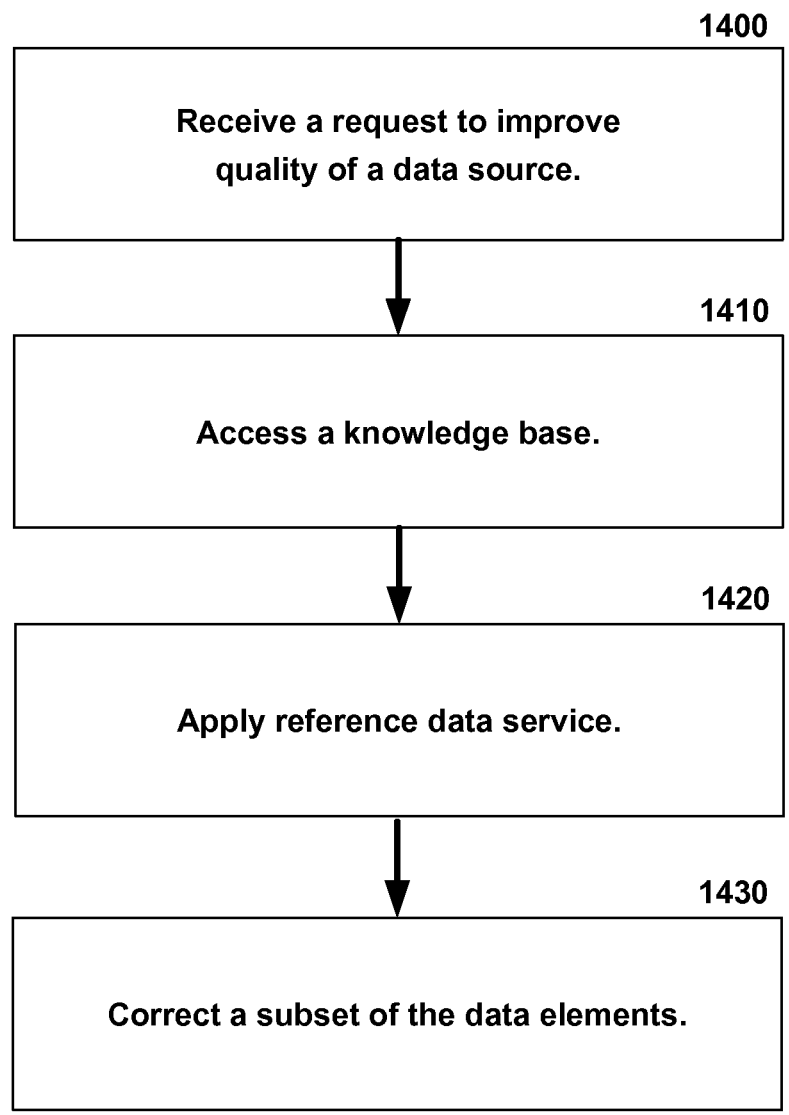
FIG. 14 illustrate a non-limiting flow diagram of a method for interactive cleaning of data, according to an aspect.

FIG. 14 illustrate a non-limiting flow diagram of a method for interactive cleaning of data, according to an aspect. At 1400, a request to improve quality of a data source is received. A knowledge base that includes information related to data elements in the data source is accessed, at 1410. In accordance with some aspects, the accessing comprises obtaining reference data definitions for the data elements. According to some aspects, the accessing comprises obtaining values and rules to apply to the data elements. In some aspects, the accessing comprises obtaining a matching policy configured to identify and eliminate duplicates among the data elements.

At 1420, a reference data service is accessed from an external source. In accordance with some aspects, the accessing includes accessing the reference data service from a third party data service. According to some aspects, the accessing comprises selecting the reference data service, wherein the reference data service is applied by the external source.

At 1430, a subset of the data elements are corrected as a function of the knowledge base and the reference data service. According to an aspect, the correcting comprises reviewing the data elements for incorrect records. Further to this aspect, the correcting includes outputting a suggestion (e.g., to a user) to correct at least one of the incorrect records. A correction can be applied to one of the incorrect records based on receiving an affirmative reply to the suggestion.

Figure 15:
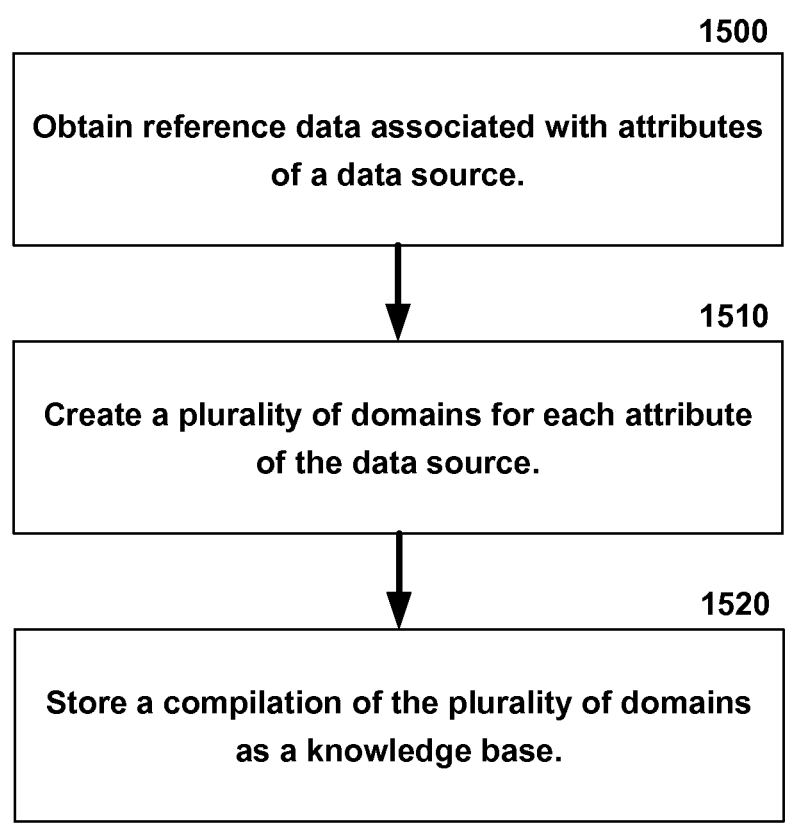
FIG. 15 illustrates a non-limiting flow diagram of a method for creating a knowledge base, according to an aspect.

FIG. 15 illustrates a non-limiting flow diagram of a method for creating a knowledge base, according to an aspect. At 1500, reference data associated with attributes of a data source are obtained. In accordance with some aspects, the obtaining comprises obtaining reference data definitions for the attributes. According to some aspects, the obtaining comprises associating rules with one or more of the attributes.

At 1510, a plurality of domains are created for each attribute of the data source. Each of the plurality of domains comprise an attribute and reference data associated with the attribute. According to an aspect, the creating comprises creating a basic domain that includes quality data issues associated with the attributes. Examples of basic domains include email alias, gender, and state. In some aspects, the creating comprises creating a composite domain that comprises two or more basic domains. Examples of composite domains include the following Full Name (Given+Middle+Surname)
Address (Street+City+State+Country)

A rule can be applied across the two or more basic domains. Domain knowledge includes properties and values. Examples of properties are name and type. Examples of values are correct, errors, synonyms.

A compilation of the plurality of domains are stored as a knowledge base, at 1520. According to an aspect, the storing comprises uploading the knowledge base to a store maintained by an external source. In accordance with some aspects, the method can also include retrieving (e.g., downloading) the knowledge base and performing one or more processes on the data as a function of the domains contained in the knowledge base.

As discussed herein, the disclosed aspects provide a knowledge-driven data quality solution that is based on a rich knowledge base. The data quality solution can provide continuous improvement and can be based on continuous (or on-going) knowledge acquisition. The data quality solution can be built once and can be reused for multiple data quality improvements, which can be for the same data or for similar data. The disclosed aspects are easy to use and focus on productivity and user experience. Further, the disclosed aspects are open and extendible and can be applied to cloud-based reference data (e.g., a third party data source) and/or user generated knowledge. According to some aspects, the disclosed aspects can be integrated with data integration services, such as SQL server integration services (SSIS) or a different data integration service.

Exemplary Networked and Distributed Environments

One of ordinary skill in the art can appreciate that the various embodiments of the data quality solution systems and methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects, or resources that may participate in the access control and execution mechanisms as described for various embodiments of the subject disclosure.

Figure 16:
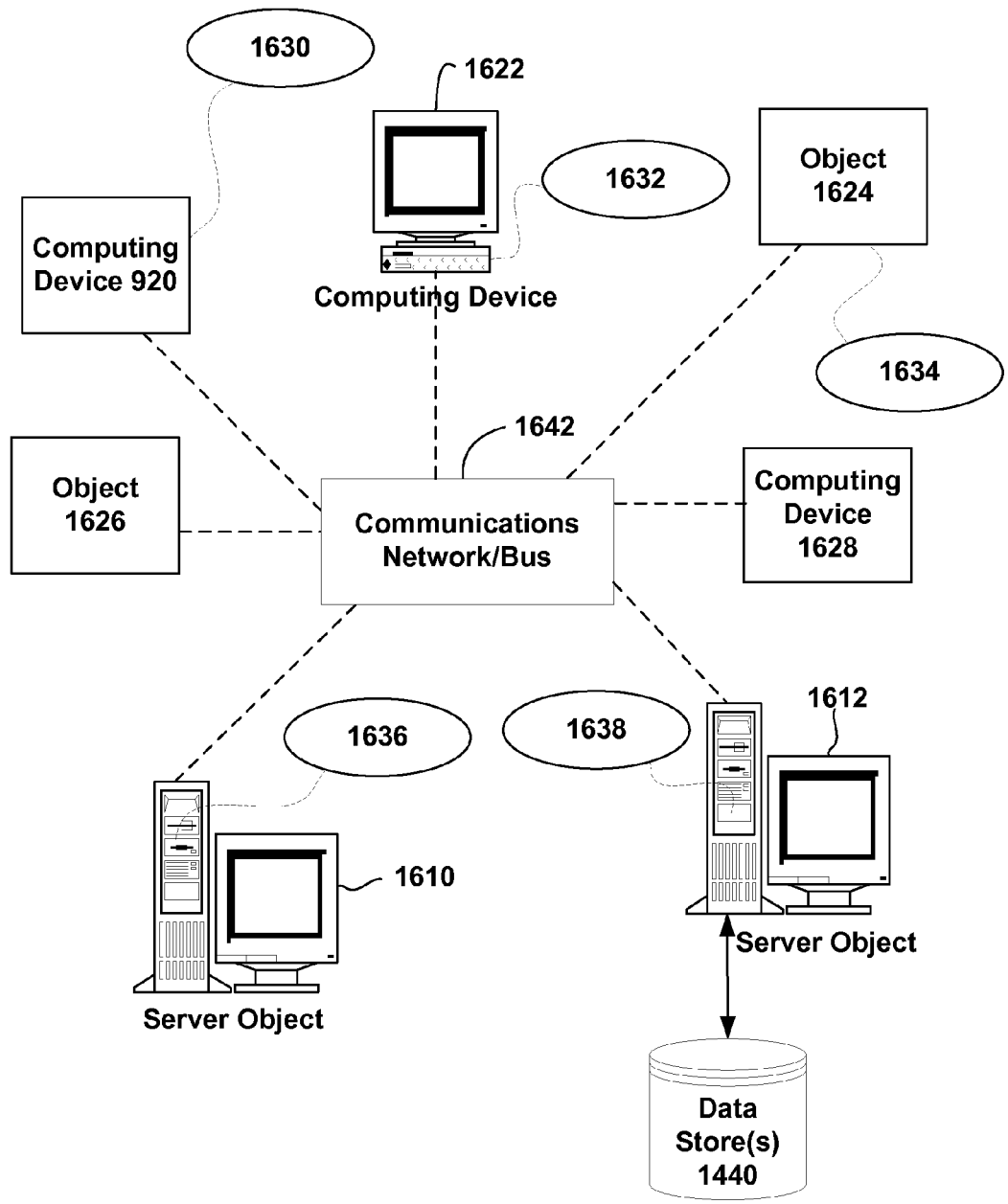
FIG. 16 is a block diagram representing exemplary non-limiting networked environments in which various embodiments described herein can be implemented.

FIG. 16 provides a schematic diagram of an exemplary networked or distributed computing environment. The distributed computing environment comprises computing objects 1610, 1612, etc. and computing objects or devices 1620, 1622, 1624, 1626, 1628, etc., which may include programs, methods, data stores, programmable logic, etc., as represented by applications 1630, 1632, 1634, 1636, 1638 and data store(s) 1640. It can be appreciated that computing objects 1610, 1612, etc. and computing objects or devices 1620, 1622, 1624, 1626, 1628, etc. may comprise different devices, such as personal digital assistants (PDAs), audio/video devices, mobile phones, MP3 players, personal computers, laptops, etc.

Each computing object 1610, 1612, etc. and computing objects or devices 1620, 1622, 1624, 1626, 1628, etc. can communicate with one or more other computing objects 1610, 1612, etc. and computing objects or devices 1620, 1622, 1624, 1626, 1628, etc. by way of the communications network 1642, either directly or indirectly. Even though illustrated as a single element in FIG. 16, communications network 1642 may comprise other computing objects and computing devices that provide services to the system of FIG. 16, and/or may represent multiple interconnected networks, which are not shown. Each computing object 1610, 1612, etc. or computing object or devices 1620, 1622, 1624, 1626, 1628, etc. can also contain an application, such as applications 1630, 1632, 1634, 1636, 1638, that might make use of an API, or other object, software, firmware and/or hardware, suitable for communication with or implementation of the access control and management techniques provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, although any network infrastructure can be used for exemplary communications made incident to the access control management systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 16, as a non-limiting example, computing objects or devices 1620, 1622, 1624, 1626, 1628, etc. can be thought of as clients and computing objects 1610, 1612, etc. can be thought of as servers where computing objects 1610, 1612, etc., acting as servers provide data services, such as receiving data from client computing objects or devices 1620, 1622, 1624, 1626, 1628, etc., storing of data, processing of data, transmitting data to client computing objects or devices 1620, 1622, 1624, 1626, 1628, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1642 or bus is the Internet, for example, the computing objects 1610, 1612, etc. can be Web servers with which other computing objects or devices 1620, 1622, 1624, 1626, 1628, etc. communicate via any of a number of known protocols, such as the hypertext transfer protocol (HTTP). Computing objects 1610, 1612, etc. acting as servers may also serve as clients, e.g., computing objects or devices 1620, 1622, 1624, 1626, 1628, etc., as may be characteristic of a distributed computing environment.

Exemplary Computing Device

As mentioned, advantageously, the techniques described herein can be applied to any device where it is desirable to implementing data quality solutions in a computing system. It can be understood, therefore, that handheld, portable and other computing devices and computing objects of all kinds are contemplated for use in connection with the various embodiments, i.e., anywhere that resource usage of a device may be desirably enhanced. Accordingly, the below general purpose remote computer described below in FIG. 17 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 17:
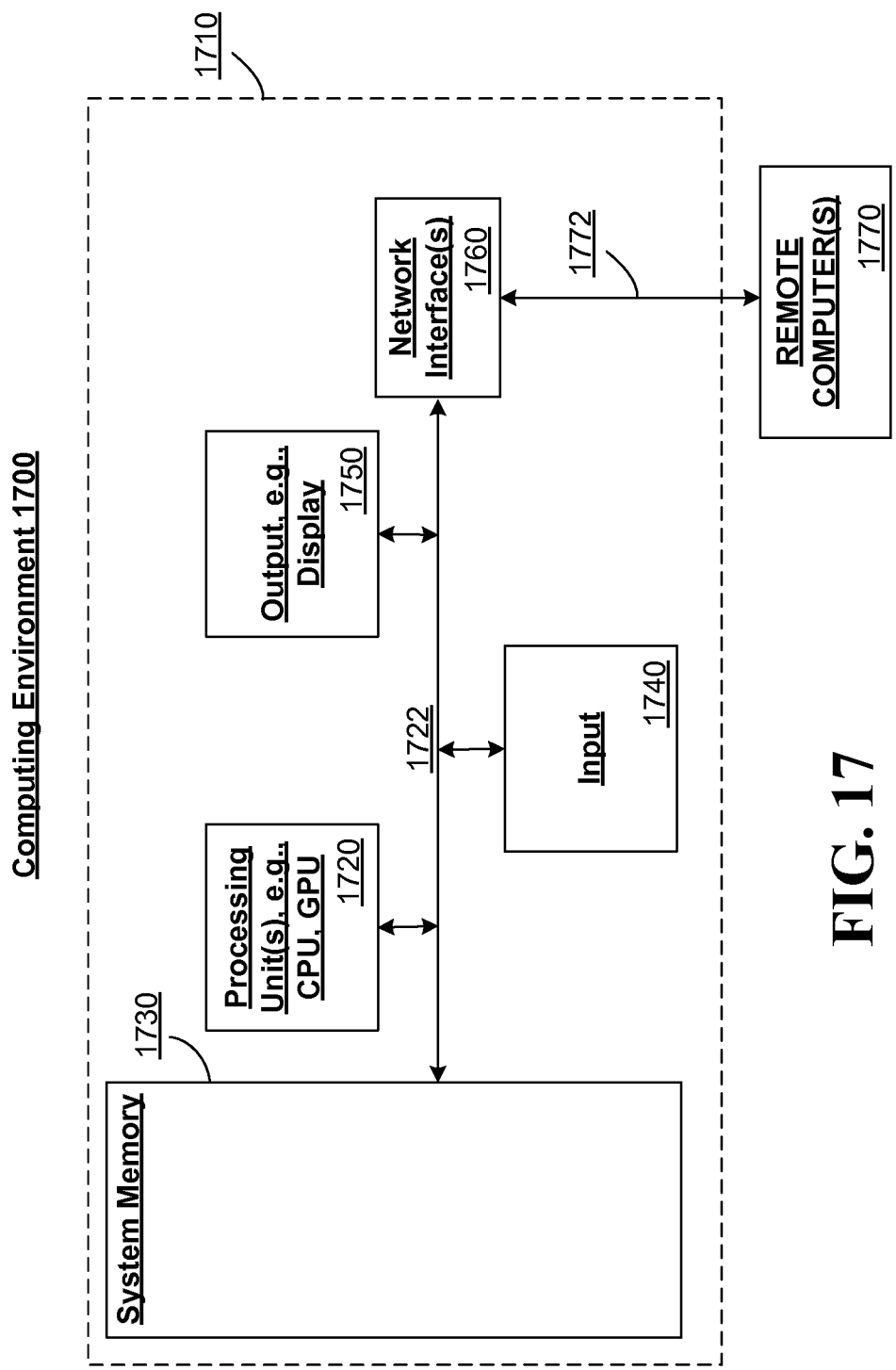
FIG. 17 is a block diagram representing an exemplary non-limiting computing system or operating environment in which one or more aspects of various embodiments described herein can be implemented.

FIG. 17 thus illustrates an example of a suitable computing system environment 1700 in which one or aspects of the embodiments described herein can be implemented, although as made clear above, the computing system environment 1700 is only one example of a suitable computing environment and is not intended to suggest any limitation as to scope of use or functionality. Neither should the computing system environment 1700 be interpreted as having any dependency or requirement relating to any one or combination of components illustrated in the exemplary computing system environment 1700.

With reference to FIG. 17, an exemplary remote device for implementing one or more embodiments includes a general purpose computing device in the form of a computer 1710. Components of computer 1710 may include, but are not limited to, a processing unit 1720, a system memory 1730, and a system bus 1722 that couples various system components including the system memory to the processing unit 1720.

Computer 1710 typically includes a variety of computer readable media and can be any available media that can be accessed by computer 1710. The system memory 1730 may include computer storage media. Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information deli very or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

A user can enter commands and information into the computer 1710 through input devices 1740. A monitor or other type of display device is also connected to the system bus 1722 via an interface, such as output interface 1750. In addition to a monitor, computers can also include other peripheral output devices such as speakers and a printer, which may be connected through output interface 1750.

The computer 1710 may operate in a networked or distributed environment using logical connections, such as network interfaces 1760, to one or more other remote computers, such as remote computer 1770. The remote computer 1770 may be a personal computer, a server, a router, a network PC, a peer device or other common network node, or any other remote media consumption or transmission device, and may include any or all of the elements described above relative to the computer 1710. The logical connections depicted in FIG. 17 include a network 1772, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system.

In addition, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains" and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Subcomponents can also be implemented as components communicatively coupled to other components rather than included within parent components (hierarchical). Additionally, it can be noted that one or more components may be combined into a single component providing aggregate functionality or divided into several separate sub-components, and that anyone or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described above, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A system for data quality solutions, comprising:
   an access module configured to acquire data information for a first set of data and a second set of data from a server;
   a domain creation module configured to create one or more domains for the first set of data and the second set of data, wherein at least one of the domains is a composite domain including a plurality of basic domains, and a relationship between the plurality of basic domains is defined within the composite domain; and
   a compile module configured to aggregate the one or more domains and populate a knowledge base with the aggregated domains, wherein the knowledge base is used for processing one or more data quality sets.

2. The system of claim 1, wherein the domain creation module is configured to create the domain as a function of the first set of data and the second set of data or attributes of the first set of data and the second set of data.

3. The system of claim 1, wherein the domain creation module is further configured to create a basic domain that includes quality data issues associated with attributes of the first set of data or the second set of data.

4. The system of claim 1, wherein at least one rules is applied across two or more of the plurality of basic domains.

5. The system of claim 1, wherein the access module is configured to acquire data information through an aided knowledge acquisition process.

6. The system of claim 1, wherein the knowledge base comprises a plurality of domains packaged as a single movable unit.

7. The system of claim 1, wherein the knowledge base is stored in a sharable and downloadable format.

8. The system of claim 1, further comprising:
   an acquisition module configured to obtain semantic information for a first set of data and a second set of data;
   a matching module configured to identify duplicates between the first set of data and the second set of data based in part on the semantic information; and a merge module configured to merge the identified duplicates at about the same time as the first set of data and the second set of data are combined.

9. The system of claim 1, further comprising a historical module configured to capture historical information related to attributes of the first set of data and the second set of data, wherein the historical information is included in a domain.

10. The system of claim 1, further comprising a statistics module configured to capture statistical information related to data quality metrics associated with a source of the first set of data and second set of data, wherein the statistical information is included in a domain.

11. The system of claim 1, further comprising an inference module configured to make one or more inferences related to the first set of data or the second set of data, wherein the one or more inferences are included in a domain.

12. A method, comprising:
obtaining reference data associated with an attribute;
creating a plurality of domains for each attribute, wherein each of the plurality of domains comprise an attribute and reference data associated with the attribute, at least one of the domains is a composite domain including a plurality of basic domains, and a relationship between the plurality of basic domains is defined within the composite domain; and
storing a compilation of the plurality of domains as a knowledge base.

13. The method of claim 12, wherein the obtaining comprises obtaining reference data definitions for the attributes.

14. The method of claim 12, wherein the obtaining comprises associating rules with one or more of the attributes.

15. The method of claim 12, wherein the creating comprises creating a basic domain that includes quality data issues associated with the attributes.

16. The method of claim 12, wherein a rule is applied across the two or more of the basic domains.

17. The method of claim 12, wherein the storing comprises uploading the knowledge base to a store maintained by an external source.

18. The method of claim 12, further comprises retrieving the knowledge base and performing one or more processes on the reference data as a function of the domains contained in the knowledge base.

* * * * *